(12) United States Patent
Anderson et al.

(10) Patent No.: US 10,740,548 B2
(45) Date of Patent: Aug. 11, 2020

(54) DYNAMIC REPORT BUILDING USING A HETEROGENEOUS COMBINATION OF FILTERING CRITERIA

(71) Applicant: Adobe Inc., San Jose, CA (US)

(72) Inventors: Dale A. Anderson, American Fork, UT (US); Timothy J. Lott, Orem, UT (US); James R. Meyer, Spanish Fork, UT (US); Michael J. Richardson, Orem, UT (US); Thomas M. Dillenbeck, Provo, UT (US); Kyle W. Smith, Highland, UT (US)

(73) Assignee: Adobe Inc., San Jose, CA (US)

( * ) Notice: Subject to any disclaimer, the term of this patent is extended or adjusted under 35 U.S.C. 154(b) by 184 days.

(21) Appl. No.: 15/474,211

(22) Filed: Mar. 30, 2017

(65) Prior Publication Data
US 2017/0270089 A1   Sep. 21, 2017

Related U.S. Application Data

(63) Continuation of application No. 13/565,662, filed on Aug. 2, 2012, now Pat. No. 9,645,990.

(51) Int. Cl.
| | | |
|---|---|---|
| G06F 17/00 | (2019.01) | |
| G06F 40/177 | (2020.01) | |
| G06Q 10/06 | (2012.01) | |

(52) U.S. Cl.
CPC ......... *G06F 40/177* (2020.01); *G06Q 10/06* (2013.01)

(58) Field of Classification Search
CPC ............ G06F 17/246; G06F 17/30592; G06F 17/30292; G06F 17/30563;
(Continued)

(56) References Cited

U.S. PATENT DOCUMENTS 7,085,682 B1 *  8/2006  Heller ................... G06Q 30/02
                                                        702/186
7,752,308 B2     7/2010  Hutchinson
(Continued)

FOREIGN PATENT DOCUMENTS

EP          1891511          2/2008

OTHER PUBLICATIONS

U.S. Appl. No. 13/565,662 , "Advisory Action", dated Jul. 2, 2015, 4 pages.
(Continued)

*Primary Examiner* — Di Xiao
(74) *Attorney, Agent, or Firm* — Kilpatrick Townsend & Stockton LLP

(57) ABSTRACT

Methods and apparatus are presented for flexibly building a dynamic report using a heterogeneous mix of dimensions, segments, and metrics. Within a report building tool a user may introduce any number of dimensions and segments at any point within a generated report. Further within the report building tool, a user may break down existing dimensions and segments within a report with nested dimensions and segments, which may be added without limits on a nesting level. Given a generated report, a user may pivot the generated report, where the pivot includes pivoting any heterogeneous combination of dimensions, segments, and metrics within the generated report defined along each axis. Further, the pivot operation maintains the relative groupings and nestings of dimensions, dimension items, segments, and metrics in going from a column to a row or from a row to a column.

20 Claims, 27 Drawing Sheets

(58) Field of Classification Search
CPC ......... G06F 17/30327; G06F 17/30339; G06F 17/30923; G06F 3/04842; G06F 3/0488; G06F 17/212; G06F 17/245; G06F 17/30017; G06F 17/30076; G06F 17/30312; G06F 17/30466; G06F 17/30917; G06F 17/3092; G06F 3/0481; G06F 3/04883; G06F 17/30091; G06F 17/30345; G06F 17/30424; G06F 17/30477; G06F 17/30554; G06F 17/30572; G06F 17/30575; G06F 17/30598; G06F 17/30979; G06F 3/0482; G06F 7/00; G06F 8/453; G06F 11/3668; G06F 17/2247

See application file for complete search history.

(56) References Cited

U.S. PATENT DOCUMENTS

| | | | | |
|---|---|---|---|---|
| 8,095,866 | B2* | 1/2012 | Folting | G06F 17/246 |
| | | | | 715/212 |
| 8,645,313 | B1* | 2/2014 | Li | G06F 17/30312 |
| | | | | 706/46 |
| 8,700,537 | B1 | 4/2014 | Deshpande et al. | |
| 2003/0154442 | A1 | 8/2003 | Papierniak | |
| 2004/0158429 | A1 | 8/2004 | Bary et al. | |
| 2004/0243616 | A1 | 12/2004 | Benhase et al. | |
| 2007/0136683 | A1* | 6/2007 | Heidari | G06F 9/451 |
| | | | | 715/792 |
| 2010/0205521 | A1* | 8/2010 | Folting | G06F 17/246 |
| | | | | 715/227 |
| 2010/0251128 | A1 | 9/2010 | Cordasco | |
| 2011/0029853 | A1 | 2/2011 | Garrity et al. | |
| 2012/0072723 | A1* | 3/2012 | Orsini | G06F 21/6209 |
| | | | | 713/165 |
| 2014/0040806 | A1 | 2/2014 | Anderson et al. | |

OTHER PUBLICATIONS

U.S. Appl. No. 13/565,662 , "Final Office Action", dated Jan. 30, 2015, 31 pages.
U.S. Appl. No. 13/565,662 , "Final Office Action", dated Jun. 21, 2016, 43 pages.
U.S. Appl. No. 13/565,662 , "Non-Final Office Action", dated May 7, 2014, 13 pages.
U.S. Appl. No. 13/565,662 , "Non-Final Office Action", dated Sep. 30, 2015, 48 pages.
U.S. Appl. No. 13/565,662 , "Notice of Allowance", dated Jan. 10, 2017, 11 pages.

* cited by examiner

FIG. 2D

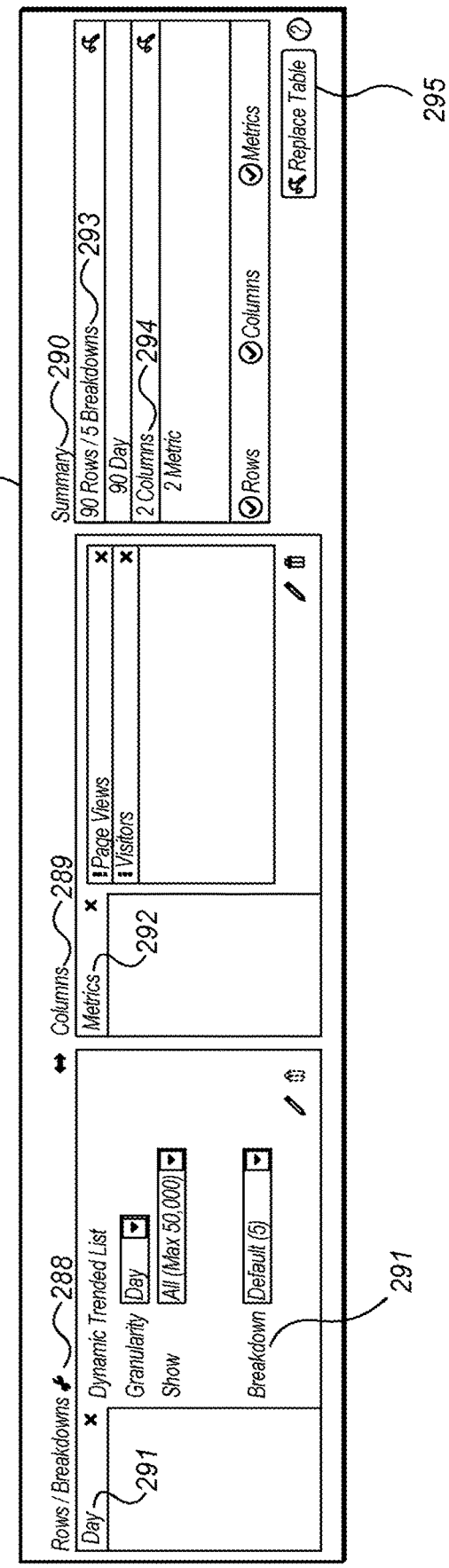

FIG. 3B

| | | | | | |
|---|---|---|---|---|---|
| 4/1/11 – 6/8/11 ▼ | | | | | |

Custom Link Views — 328
All Visits — 329

| May 1, 2011 | May 8, 2011 | May 15, 2011 | |
|---|---|---|---|
| ▼ | ▼ | ▼ | |
| (Showing 1-50 of 137) | | | 331 |
| 1,190  100.00% | 921  100.00% | 571  100.00% | |
| 348  29.24% | 236  25.46% | 0  0.00% | |
| 112  9.41% | 41  4.42% | 0  0.00% | |
| 243  20.42% | 165  17.80% | 117  20.49% | |
| ▼ | ▼ | ▼ | 332 |
| (Showing 1-10 of 1,124) | | | 333 |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 0  0.00% | 0  0.00% | 0  0.00% | |
| 24  2.02% | 30  3.24% | 19  3.33% | |
| 10  0.84% | 4  0.43% | 0  0.00% | |
| 48  4.03% | 42  4.53% | 53  9.28% | |
| 39  3.28% | 65  7.01% | 77  13.49% | |
| (Showing 3 unsorted) | | | |
| 39 | 65 | 77 | |
| 24 | 39 | 32 | |
| 9 | 17 | 24 | |
| 126  10.59% | 0  0.00% | 0  0.00% | |
| 109  9.16% | 117  12.62% | 96  16.81% | |
| 50  4.20% | 164  17.69% | 143  25.04% | |
| 0  0.00% | 0  0.00% | 0  0.00% | |
| 0  0.00% | 0  0.00% | 1  0.18% | |
| 19  1.60% | 12  1.29% | 15  2.63% | |
| (Showing 3 unsorted) | | | 334 |
| 0  0.00% | 0  0.00% | 0  0.00% | |
| 8  0.67% | 7  0.76% | 4  0.70% | |
| 7  0.59% | 8  0.86% | 8  1.40% | |
| 7  0.59% | 1  0.11% | 0  0.00% | |
| 1  0.08% | 2  0.22% | 1  0.18% | |
| 6  0.50% | 3  0.32% | 10  1.75% | |
| | | Count Page Reloads: Yes | |

| Loyal Visitors | | First Time Visitors | Loyal Visitors | | Purchasers | |
|---|---|---|---|---|---|---|
| 7,030 | 100.00% | | 1,399,111 | 100.00% | 118,115 | 100.00% |
| 3,393 | 48.26% | | 467,108 | 33.38% | 37,462 | 31.72% |
| 554 | 7.88% | | 221,804 | 15.85% | 13,293 | 11.25% |
| 1,156 | 16.44% | | 162,197 | 11.59% | 16,067 | 13.60% |
| 0 | 0.00% | | 84,690 | 52.21% | 6,671 | 41.52% |
| 0 | 0.00% | | 68,804 | 42.42% | 7,393 | 46.01% |
| 0 | 0.00% | | 51,897 | 32.00% | 9,936 | 61.84% |
| 0 | 0.00% | | 45,620 | 28.13% | 8,750 | 54.46% |
| 0 | 0.00% | | 40,974 | 25.26% | 3,817 | 23.76% |
| 0 | 0.00% | | 40,199 | 24.78% | 8,037 | 50.02% |
| 0 | 0.00% | | 37,158 | 22.91% | 7,512 | 46.75% |
| 0 | 0.00% | | 35,688 | 22.00% | 7,398 | 46.04% |
| 0 | 0.00% | | 34,594 | 21.33% | 7,227 | 44.98% |
| 0 | 0.00% | | 20,362 | 12.55% | 2,196 | 13.67% |
| 122 | 1.74% | | 127,590 | 9.12% | 12,305 | 10.42% |
| 32 | 0.46% | | 87,496 | 6.25% | 2,658 | 2.25% |
| 282 | 4.01% | | 69,346 | 4.96% | 11,490 | 9.73% |
| 115 | 1.64% | | 45,475 | 3.25% | 5,225 | 4.42% |
| 115 | | | 45,475 | | 5,225 | |
| 0 | | | 41,712 | | 0 | |
| 115 | | | 5,225 | | 5,225 | |
| 216 | 3.07% | | 39,983 | 2.86% | 3,563 | 3.02% |
| 262 | 3.73% | | 32,733 | 2.34% | 3,451 | 2.92% |
| 199 | 2.83% | | 26,218 | 1.87% | 3,451 | 2.92% |
| 113 | 1.61% | | 26,008 | 1.86% | 1,888 | 1.60% |
| 217 | 3.09% | | 18,832 | 1.35% | 2,649 | 2.24% |
| 108 | 1.54% | | 15,405 | 1.10% | 1,490 | 1.26% |
| | | 10,170 | | | | |
| | | 14,676 | | | | |
| | | 14,676 | | | | |
| 0 | 0.00% | | 12,628 | 0.90% | 4 | 0.00% |
| 21 | 0.30% | | 11,200 | 0.80% | 1,706 | 1.44% |
| 38 | 0.54% | | 7,726 | 0.55% | 632 | 0.54% |
| 12 | 0.17% | | 7,671 | 0.55% | 781 | 0.66% |
| 22 | 0.31% | | 6,611 | 0.47% | 1,075 | 0.91% |
| 19 | 0.27% | | 4,507 | 0.32% | 422 | 0.36% |

FIG. 3D

| Loyal Visitors | | First Time Visitors | | Visitors | | Purchasers | |
|---:|---:|---:|---:|---:|---:|---:|---:|
| 7,030 | 100.00% | | | 1,399,111 | 100.00% | 118,115 | 100.00% |
| 3,393 | 48.26% | | | 467,108 | 33.38% | 37,462 | 31.72% |
| 554 | 7.88% | | | 221,804 | 15.85% | 13,293 | 11.25% |
| 1,156 | 16.44% | | | 162,197 | 11.59% | 16,067 | 13.60% |
| 0 | 0.00% | | | 84,690 | 52.21% | 6,671 | 41.52% |
| 0 | 0.00% | | | 68,804 | 42.42% | 7,393 | 46.01% |
| 0 | 0.00% | | | 51,897 | 32.00% | 9,936 | 61.84% |
| 0 | 0.00% | | | 45,620 | 28.13% | 8,750 | 54.46% |
| 0 | 0.00% | | | 40,974 | 25.26% | 3,817 | 23.76% |
| 0 | 0.00% | | | 40,199 | 24.78% | 8,037 | 50.02% |
| 0 | 0.00% | | | 37,158 | 22.91% | 7,512 | 46.75% |
| 0 | 0.00% | | | 35,688 | 22.00% | 7,398 | 46.04% |
| 0 | 0.00% | | | 34,594 | 21.33% | 7,227 | 44.98% |
| 0 | 0.00% | | | 20,362 | 12.55% | 2,196 | 13.67% |
| 122 | 1.74% | | | 127,590 | 9.12% | 12,305 | 10.42% |
| 32 | 0.46% | | | 87,496 | 6.25% | 2,658 | 2.25% |
| 282 | 4.01% | | | 69,346 | 4.96% | 11,490 | 9.73% |
| 115 | 1.64% | | | 45,475 | 3.25% | 5,225 | 4.42% |
| 115 | | | | 45,475 | | 5,225 | |
| 0 | | | | 41,712 | | 0 | |
| 115 | | | | 5,225 | | 5,225 | |
| 216 | 3.07% | | | 39,983 | 2.86% | 3,563 | 3.02% |
| 262 | 3.73% | | | 32,733 | 2.34% | 3,451 | 2.92% |
| 199 | 2.83% | | | 26,218 | 1.87% | 3,451 | 2.92% |
| 113 | 1.61% | | | 26,008 | 1.86% | 1,888 | 1.60% |
| 217 | 3.09% | | | 18,832 | 1.35% | 2,649 | 2.24% |
| 108 | 1.54% | | | 15,405 | 1.10% | 1,490 | 1.26% |
| | | 10,170 | | | | | |
| | | 14,676 | | | | | |
| | | 14,676 | | | | | |
| 0 | 0.00% | | | 12,628 | 0.90% | 4 | 0.00% |
| 21 | 0.30% | | | 11,200 | 0.80% | 1,706 | 1.44% |
| 38 | 0.54% | | | 7,726 | 0.55% | 632 | 0.54% |
| 12 | 0.17% | | | 7,671 | 0.55% | 781 | 0.66% |
| 22 | 0.31% | | | 6,611 | 0.47% | 1,075 | 0.91% |
| 19 | 0.27% | | | 4,507 | 0.32% | 422 | 0.36% |

FIG. 3E

| Rows / Breakdowns ✏ | | Columns | | Summary |
|---|---|---|---|---|
| ✕ Browsers | | Segments ✕ | | 50 Rows / 5 Breakdowns |
| Dynamic Ranked List | | Metrics ✕ | | 50 Browsers |
| Show [Default (50) ▼] | | | First Time Visits | 6 Columns |
| Search 🔍 | | | Loyal Visitors | 2 Segment |
| Breakdown [Default (5) ▼] | | | | 3 Metric |
| ✏ 🗑 | | ✏ 🗑 | | ⊙ Rows ⊙ Columns ⊙ Metrics |
| | | | | ⟳ Replace Table |

399A

399B — 399C — :: First Time Visits :: Loyal Visitors

| ⁞⁞Browsers ⟳ ✕ | ⁞⁞1. Visits | ⁞⁞2. Visitors | ⁞⁞3. Page Views | ⁞⁞4. Visits | ⁞⁞5. Visitors | ⁞⁞6. Page Views |
|---|---|---|---|---|---|---|
| | | | | | View [50 ▼] ◀1▶ /page ◀1▶ 1-50 of 63 | View [10 ▼] ◀1▶ /page ◀1▶ 6-10 of 58 |
| Total | 6,642 | 6,642 | 9,615 | 408 | 187 | 716 |
| 1. None | 1,966 | 1,968 | 2,590 | 166 | 76 | 245 |
| 2. Microsoft Internet Explorer... ⟳ ✕ | 776 | 776 | 1,202 | 17 | 13 | 40 |
| :Page 🔍 | | | | | | |
| Total | 776 | 776 | 1,202 | 17 | 13 | 40 |
| 1. Trails360 | Mt. Tm... | 107 | 107 | 138 | 5 | 4 | 8 |
| 2. Trails360 | Mt. Dia... | 93 | 93 | 127 | 2 | 2 | 3 |
| 3. Trails360 | Mount O... | 77 | 77 | 91 | 3 | 2 | 4 |
| 4. Trails360 | The Gro... | 71 | 71 | 94 | 0 | 0 | 0 |
| 5. Trails360 | Stewart... | 66 | 66 | 78 | 2 | 1 | 4 |
| 6. Trails360 | Kings P... | 43 | 43 | 69 | 0 | 0 | 0 |
| 7. Trails360 | St. Geo... | 41 | 41 | 66 | 2 | 1 | 1 |
| 8. Trails360 | Donut F... | 41 | 41 | 52 | 1 | 1 | 1 |
| 9. Trails360 | Cascad... | 30 | 30 | 34 | 1 | 0 | 0 |
| 10. Trails360 | Cubera... | 30 | 30 | 36 | 0 | 0 | 0 |
| 3. Microsoft Internet Explorer... | 610 | 610 | 690 | 16 | 13 | 37 |
| 4. Google Chrome 19.0 | 525 | 525 | 815 | 21 | 16 | 31 |
| ⁞⁞Segments ⟳ ✕ | | | | | | |
| 1. Visits referred by G... | 444 | 444 | 659 | 7 | 7 | 7 |
| 2. Visits referred by Y... | 3 | 3 | 3 | 0 | 0 | 0 |
| 3. Visits referred by M... | 0 | 0 | 0 | 0 | 0 | 0 |
| 4. Visits referred by M... | 0 | 0 | 0 | 0 | 0 | 0 |

--- 399D

DYNAMIC REPORT BUILDING USING A HETEROGENEOUS COMBINATION OF FILTERING CRITERIA

CROSS-REFERENCE TO RELATED APPLICATIONS

This application claims priority to U.S. patent application Ser. No. 13/565,662, filed, Aug. 2, 2012 entitled "DYNAMIC REPORT BUILDING USING A HETEROGENEOUS COMBINATION OF FILTERING CRITERIA," the contents of which is incorporated herein by reference in its entirety.

BACKGROUND

Finding insights into large sets of data is a challenge under most circumstances. Traditional tools for generating reports from a set of data are limited to allowing a user to select fields and metrics of the data and a filter by which to narrow the data set as a whole within the report. However, traditional tools are incapable of adding unlimited combinations of field, filter, and metric breakdowns to reports. Further, traditional tools are incapable of nesting unlimited heterogeneous combinations of field, filter, and metric breakdowns at any point within a generated report. While pivoting of the X- and Y-axis of a report is sometimes supported by traditional reporting tools, pivoting of a report that is composed of unlimited heterogeneous combinations of field, filter, and metric nestings is not contemplated by traditional reporting tools.

SUMMARY

In one embodiment, a report building tool is provided that dynamically generates a report corresponding to dimension, segment, and metric inputs, where the dimension input may indicate a field of data, the segment input may indicate a filter of the data, and the metric may indicate a quantitatively measurable element of the data. Further, the dimension may correspond to one or more dimension items within the data and the segment input may filter one or more elements of the data. The dynamic nature of the report is reflected, in one example, in automatic updates of a generated report as a user adds or removes dimensions, segments, and/or metrics. The dynamic report is unrestricted in flexibility regarding a nesting level and a quantity of dimensions, segments, and metrics that may be added to a report or to a portion of the report. Given such flexibility in a report building tool, a user may manipulate and focus data in nearly an unlimited variety of ways.

BRIEF DESCRIPTION OF THE DRAWINGS

FIG. 2A-2J depict illustrations of a report building tool displaying example steps in the process of building a report, according to some embodiments.

FIGS. 3A-3E depict illustrations of several aspects of a report generated by a report building tool, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

Figure 11A:
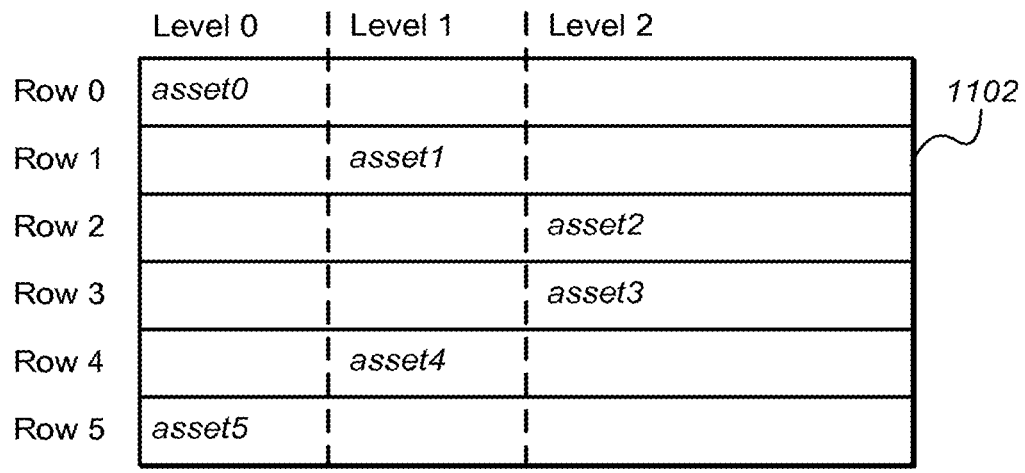
Figure 11B:
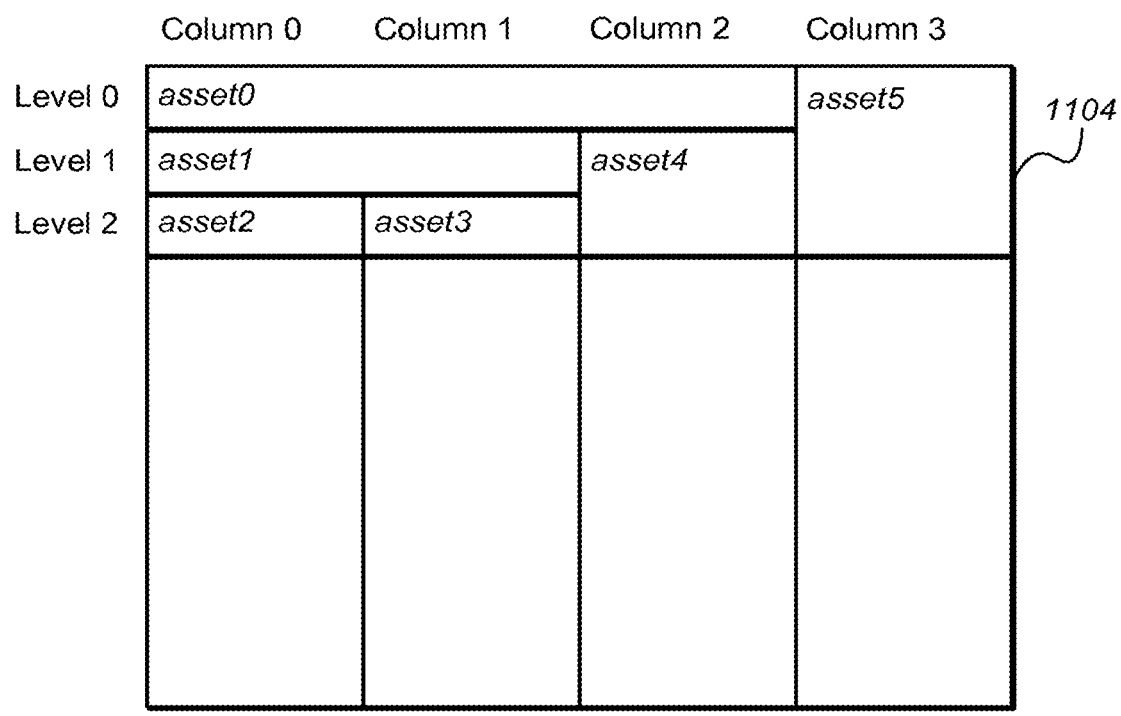

FIGS. 11A and 11B depict portions of a report illustrating row and column hierarchies, according to some embodiments.

DETAILED DESCRIPTION OF THE EMBODIMENTS

Various embodiments are presented for a report building tool for generating a report where the report building tool allows a user to embed an unlimited number of dimensions, dimension items, segments, and metrics to any row or column of a report. The report building tool further allows a user to pivot the X- and Y-axis of the report, including each of the embedded dimensions, dimension items, segments, and metrics such that the respective hierarchical structures of the dimensions, dimension items, segments, and metrics along the X- and Y-axis are maintained after pivoting. The report building tool, in allowing heterogeneous combinations of dimensions, segments, and metrics, where the heterogeneous combinations are allowable along both the X- and Y-axis, allows a user to manipulate data in ways that are not possible with traditional reporting tools.

The report building tool may manipulate, for example, web analytics data. While many of the below examples described are with regard to analytics data, any structured data set that includes quantitatively measured attributes may be used by the report building tool. In this application, in some embodiments, a segment is equivalent to a filter of a set of data, a dimension is equivalent to a field of a set of data, and a metric may correspond to any element of data that may be measured as a quantitative data value. In this application, in some embodiments, a segment, a dimension, or a dimension item may each be considered filters that may be applied to a data set. Further, dimensions, dimension items, segments, or metrics may be referred to as assets, assets of a report, assets of a table, assets of a row, or assets of a column. Dates or date ranges may also be considered assets that may be added to a report, where a given date or date range is applied as a filter to a data set similarly to how a segment is applied. In this way, a breakdown by a date or date range may be added as a row or column in a report or the date or date range may be added to a hierarchy of assets of an existing row or column in the report.

For example, in the web analytics realm, at least a portion of a data set may be organized according to a city dimension. Further, a dimension item may be a particular city, such as Tokyo or Fresno. As another example, a metric may be a measurable attribute such as page visitors, which would correspond to a numerical value equal to all page visitors for a given content page. As another example, a segment may serve as a filter, such as a purchasers segment, which (in the case that not every visitor made a purchase) would narrow the group defined by the metric page visitors to a subset of all page visitors corresponding to the visitors that completed a purchase.

In order for an analyst to effectively tap into the utility of their data, it is important for the analyst to be able to view their data in a variety of ways. The more ways an analyst is allowed to organize, filter, and view data, the better poised the analyst may be to find valuable insights into data. Using the report building tool, due to the lack of restrictions on the combinations of dimensions, dimension items, segments, and metrics along either axis of a report, a user may intersect any asset along the X-axis with any asset along the Y-axis. In the case that different metrics are specified to intersect, the intersecting cell of the report may be left blank or somehow indicated as undefined.

Further, in some embodiments, dimensions and segments may be added to a report such that the scope of their influence only corresponds to the visual scope of their representation within the report, without having the added dimensions or segments apply to the entire table. For example, in these embodiments, a dimension item may be added as a single column within the report and the dimension item may exclusively apply to elements of the data set corresponding to the dimension item within the column, without the dimension item applying to every column of the report. This exclusive application of a dimension item is similarly possible with any other filter or asset. Given a dimension or segment corresponding to a column, the dimension or segment may be broken down or further filtered an unlimited number of times according to additional dimensions or segments, resulting in metric values within the column filtered according to each dimension and segment specified to correspond to the column.

In some embodiments, a single column within a report may correspond to multiple segments, multiple dimensions, multiple dimension items, or multiple combinations of segments, dimensions, or dimension items. However, in such embodiments, because a cell within the table of the report contains a single value corresponding to a single metric, only one metric per column is allowed, and intersections of a particular column metric and a different row metric within a report table may be defined to be empty. If the intersecting row and column metric are the same metric, the intersecting cell may be the metric value.

In some embodiments, a user building a report may select a dimension as a row or column instead of one or more dimension items. However, a dimension may include a great number of dimension items, as in the above example where the dimension is a city and the dimension items are particular cities. In such a case, instead of creating a row or column for every single dimension item within the dimension, the report building tool may select, based on a configuration setting defined prior to the initiation of the current building of a report, a default quantity of dimension items to include in the report. For example, if a user introduces a city dimension into a row or column, then when the report is built, the report building tool may select the top five cities corresponding to the five greatest number of visitors, or corresponding to some other configurable default metric. The default number of dimension items may be set to any number and may be set by a user prior to creating a report. In some embodiments, the default number of dimension items may be displayed, however, the user may be provided with a user interface element to expand the currently displayed dimension items to a greater number of dimension items. In this example, a user may click on an icon corresponding to the last displayed dimension item, where the icon may display an ellipses, or some other indication, and when the icon is selected, another set of cities are displayed. The user may continuously select the icon until all dimension items are displayed. In this example, after each selection to display more cities, the report may be dynamically updated in response to the selection and the report building tool may retrieve additional corresponding information.

Figure 3A:
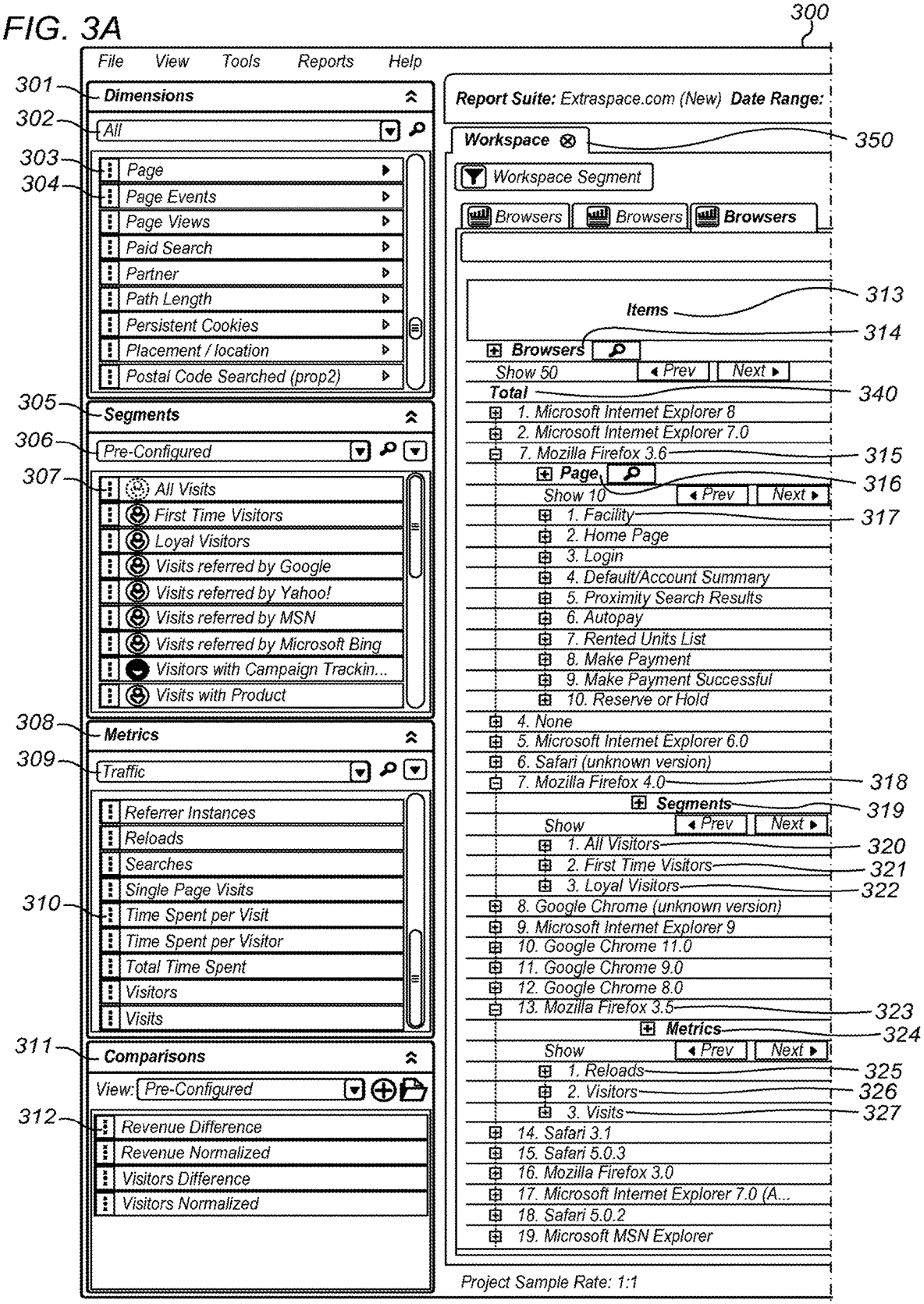

In some embodiments, the structure of a row within a table of a report may correspond to nested levels of a heterogeneous mix of metrics, segments, dimensions, and dimension items, where each nested row is encompassed by the row above. In this way, a user may define a row at the bottom of a hierarchically structured nesting of rows to be filtered according to each of the rows in the hierarchical levels above. For example, given elements 314 and 318-322 of FIG. 3A, a hierarchy may be defined as Browsers (dimension 314)>Mozilla Firefox 4.0 (dimension item 318)>All visitors (segment 320), where the row corresponding to All Visitors 320 would filter a metric in one of the columns according to all visitors using browser Mozilla Firefox 4.0. In this example, each successively nested row in the hierarchy corresponds to a successively filtered row satisfying each of the constraints, or filters, from the given row up until the top of the hierarchy. In FIG. 3A, while segments 320-322 are only nested one level under dimension item 318, the report building tool does not place any limit on the number of nestings possible or on the mix of assets nested.

In some embodiments, similar to the successive filtering corresponding to the nested hierarchical organization of a row assets, a column in a report may be stacked to provided additionally filtered results. For example, in FIG. 3B are three levels, 390392, above each of the columns in the report. Each of the levels 390-392 corresponds to an asset, in this case, level 390 corresponds to metric 328, Custom Links Views; level 391 corresponds to segment 329, All Visits; and level 392 corresponds to each of three date dimension items, May 1, 2011, May 8, 2011, and May 15, 2011. In each case, the span of the title panel in which the asset is displayed corresponds to the scope of the asset. For example, the title panel for Custom Link Views metric 328 spans each of the three columns, and therefore each of the three columns correspond to metric values for Custom Link Views. As another example, Purchasers segment 338 and Visitors metric 339 in FIG. 3C represent two levels of stacked assets, and where the title panel of Visitors metric 339 spans two columns and the title panel of Purchasers segment 338 spans one column. Therefore, in this example, Visitors metric 339 corresponds to metric values in the two rows beneath the title panel for Visitors metric 339 and the single column beneath the title panel for Purchasers segment 338 correspond to the Purchasers segment 338. The report building tool places no restrictions to the spans, or scope of assets, or on the combination of assets, or on the number of levels of assets to stack.

In some embodiments, instead of the hierarchical organization described above in regard to elements 314 and 318-322 of FIG. 3A, where each successive row is a further refinement, or a further filtering, assets corresponding to rows may also be stacked. As seen in FIG. 3A dimension item 318, Mozilla Firefox 4.0 and segment 320 each correspond to their own row. However, in a stacked row example, segment 320 may be inserted and displayed adjacent to dimension item 318 such that they correspond to the same row. In such an example, a visual indicator may be displayed between the assets to indicated the stacked nature of the assets, such as a colored vertical bar, or where the background area of the title panel area corresponding to the asset is displayed distinctively. While in the hierarchical organization discussed above, where each row corresponds to a single asset and is successively filtered, in the stacked row hierarchy, the same successive filtering is applied, however, only one row is occupied to correspond to the stacked row hierarchy. To distinguish the construction of a non-stacked row hierarchy from a stacked row hierarchy, a user may provide additional input, such as depressing a key on the keyboard while dragging an asset into the table. In other cases, the report building tool may provide an icon to toggle the behavior between the different types of hierarchical constructions, the stacked and non-stacked row hierarchies.

In some embodiments, instead of stacking assets as described above, where a single column corresponds to multiple filters, a series of columns may provide successively filtered results in a similar manner as that provided by the successively filtered results in hierarchically structured rows, discussed above. For example, FIG. 3D is similar to FIG. 3C except that Visitors 339 is now the only asset corresponding to column 397A. By contrast, in FIG. 3C, column 397A corresponded to Visitors 339 and Loyal Visitors segment 337. In this example, column 397B of FIG. 3D corresponds to two assets, Visitors metric 339 and Purchasers segment 338, or visitors having made a purchase. In this way, a user may see, within the visual grouping under the panel title bar for Visitors metric 339, a first column corresponding to all visitors and in a next column the user may see the application of a filter, Purchasers segment 338. The result is a visual grouping of columns that provides a user with successively refinements, or successive filters, allowing a user to see the results from each successive filter. The example may extend to any number of columns, where each successive column is the result of the data set as filtered according to the filter corresponding to the top of the column in addition to each filter up until the beginning of the visual grouping of columns. In some embodiments, a user may collapse successively filtered columns into stacked columns. For example, a user may select icon 398 to collapse column 397B into column 397A, resulting in a single column corresponding to two assets, Visitors metric 339 and Purchasers segment 338. In some cases, the collapse may be all at once, or incrementally through successive clicks of a collapse icon. Similarly, a single column corresponding to a stacking of multiple assets may be divided into multiple, successively filtered columns.

As noted above, a generated report may be dynamic in the sense that the report may be continuously and seamlessly modified and updated through the addition of new assets or through the reorganization of existing assets. For example, given a generated report such as the report in FIG. 3A, an analyst may see a row 318 corresponding to "Mozilla™ Firefox™ 4.0" with a filtering segment 321 corresponding to "First Time Visitors", and given this report the analyst may want to further refine the results to see how many Mozilla™ Firefox™ 4.0 first time visitors were also purchasers. To do this, the analyst simply needs to drag a "PURCHASERS" segment from segments panel 305 on top of segment 321, and the result is the additional of a hierarchical level and corresponding row with the desired slice of the analytics data set. The addition of the filtered data is added to the report dynamically in that the update occurs in response to the additional segment and the report is updated incrementally without having to generate an entirely new report.

Figure 5:
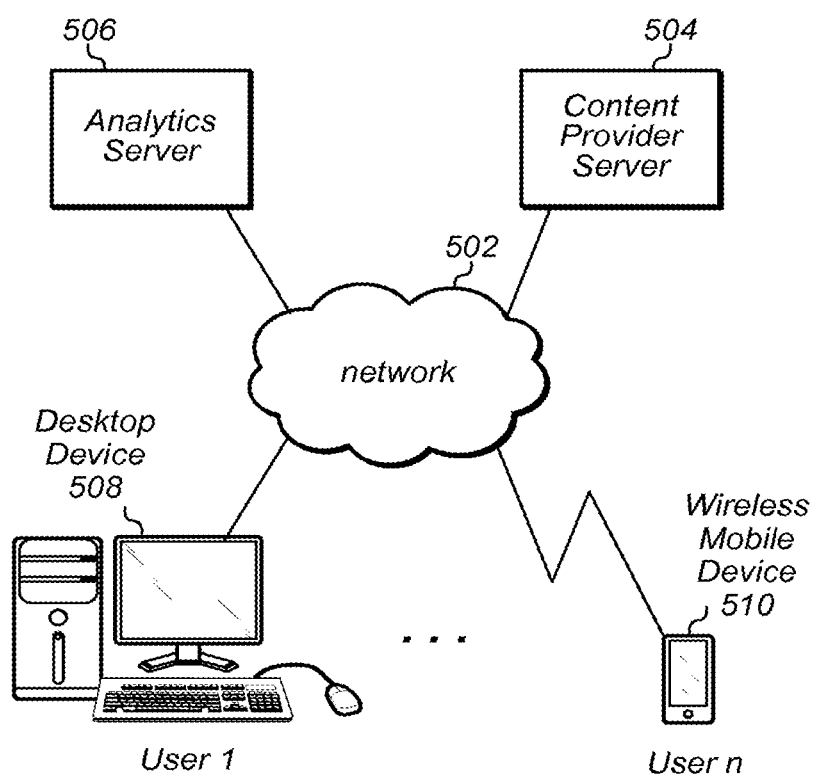
FIG. 5 depicts an illustration of a network environment in which data may be collected, according to some embodiments.

In some embodiments, the report building tool may be implemented within a stand-alone application running on a client system accessing a data set locally or in communication over a network with a remote server. An example of a client/server architecture may be seen within. FIG. 5 and the corresponding discussion below. In other embodiments, the report building tool may be implemented through a plugin installed into a network-enabled application, such as a web browser accessing information locally or in communication over a network with an analytics server, or some other type of system hosting a data set to be analyzed. In other embodiments, a network-enabled application may request a page from a server where the page is embedded with the report building tool that is invoked from the network-enabled application. In this way, a network-enabled application may be modified to run the report building tool. Given that so many elements of the report building tool may be operated through drag and drop user interface interactions, a network-enabled application on a mobile device with or without a touch-sensitive screen may be modified to execute the report building tool. In other embodiments, such as the embodiment described below in regard to FIG. 6, the report building tool may be implemented within a cloud computing environment. Other methods for accessing data sets are possible, and so long as a data set can be accessed, the disclosed report building tool may operate successfully.

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Report Building Module

Figure 7:
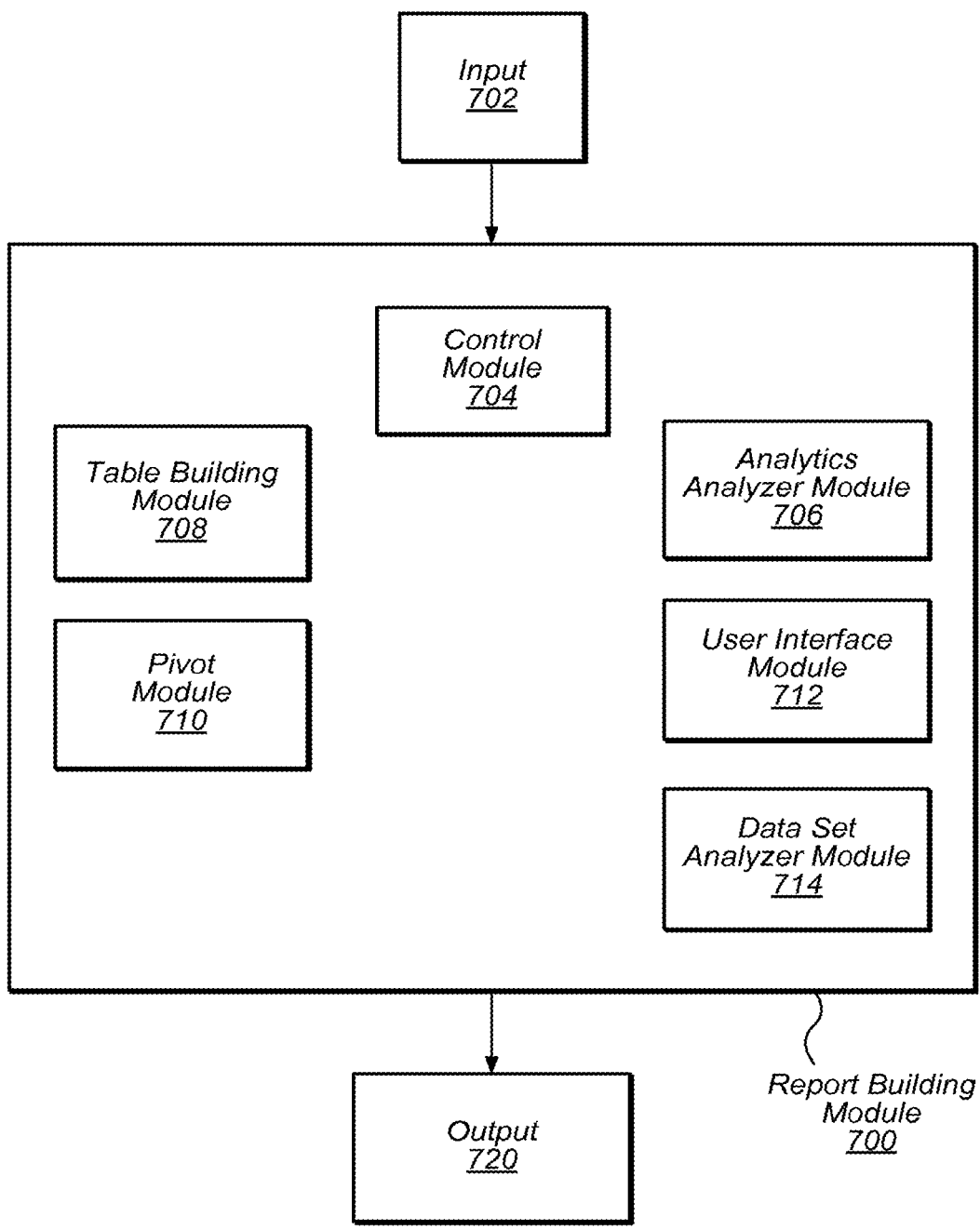
FIG. 7 illustrates a report building module, according to some embodiments.

FIG. 7 illustrates an embodiment of a Report Building Module 700. As noted above, the Report Building Module 700 may be implemented in a variety of different embodiments, including a stand-alone application.

In some embodiments, User Interface Module 712 may provide, through Output 720 a plurality of filter criteria such as dimensions, dimension items, and segments, in addition to providing a plurality of metrics, providing options to select a data set, and providing options for building a table. In some embodiments, Data Set Analyzer 714 may analyze a given data set to identify the structure of the data set, such as component fields and metrics, or through an analysis of metadata corresponding to the data set in order to determine the plurality of filter criteria and metrics to provide the user for building a report.

Through User interface Module 712 a user may specify the selection of one or more filter criteria from the plurality of filter criteria. The user may further specify one or more measurable attributes, or metrics, of the data set. Given at least a selection of a metric and a filter criterion such as a dimension, dimension item, or segment, a user may build a rudimentary report. For example, after selecting filter criteria and a metric, the user may select a report building icon in the report building tool user interface, and in response, Control Module 704 may invoke Analytics Analyzer Module 706 and provide and filter criteria and metric parameters. Analytics Analyzer Module 706 may then apply the filter criteria to obtain the appropriate results for the metrics from the data set.

Upon Analytics Analyzer Module 706 making a determination of the appropriate results, Table Building Module 708 may generate a corresponding table to display to the user as Output 720.

Given a report displayed within the report building tool user interface, the user may choose to invoke the table pivoting option to pivot the assets along the X- and Y-axis. In response to Control Module 704 receiving the indication to pivot the generated table, Pivot Module 710 may perform the analysis of the table to convert hierarchically organized assets along the Y-axis into stacked assets or hierarchically organized assets along the X-axis. In some embodiments, Pivot Module 710 may take hierarchically organized assets, such as those displayed in elements 318-322 of FIG. 3A, and create a similar hierarchical organization along the Y-axis. Whether Pivot Module 710 converts hierarchically organized assets into stacked assets or whether Pivot Module 710 converts hierarchically organized row assets into hierarchically organized column assets may be determined by the type of pivot selected or through a default setting defined prior to the pivot operation.

Performance of a pivot operation by Pivot Module 710 may also include determining visual aspects of how hierarchically organized assets along the Y-axis are to be displayed on the X-axis. Conversely, the Pivot Module 710 may also perform a pivot operation that includes determining how the visually organized assets along the X-axis are to be displayed in a hierarchical visual presentation for the Y-axis.

Upon completion of a pivot operation, Pivot Module 710 may provide the pivoted table as Output 720.

As evident in the above discussion, during different phases of execution, Report. Building Module 700 may receive input 702 indicating particular information that is dependent on the stage of building a report. For example, during the build of an initial report, input 702 may include a specification of a heterogeneous combination of dimensions, dimension items, segments, and metrics. As another example, during a dynamic modification of an already generated report, input 702 may include a specification of assets along with information regarding positional information with respect to the user interface display of the report in order to correctly determine where in the table new assets are to be introduced, such as hierarchical information or row or column information.

Example Embodiment: Report Building Tool

Figure 1A:
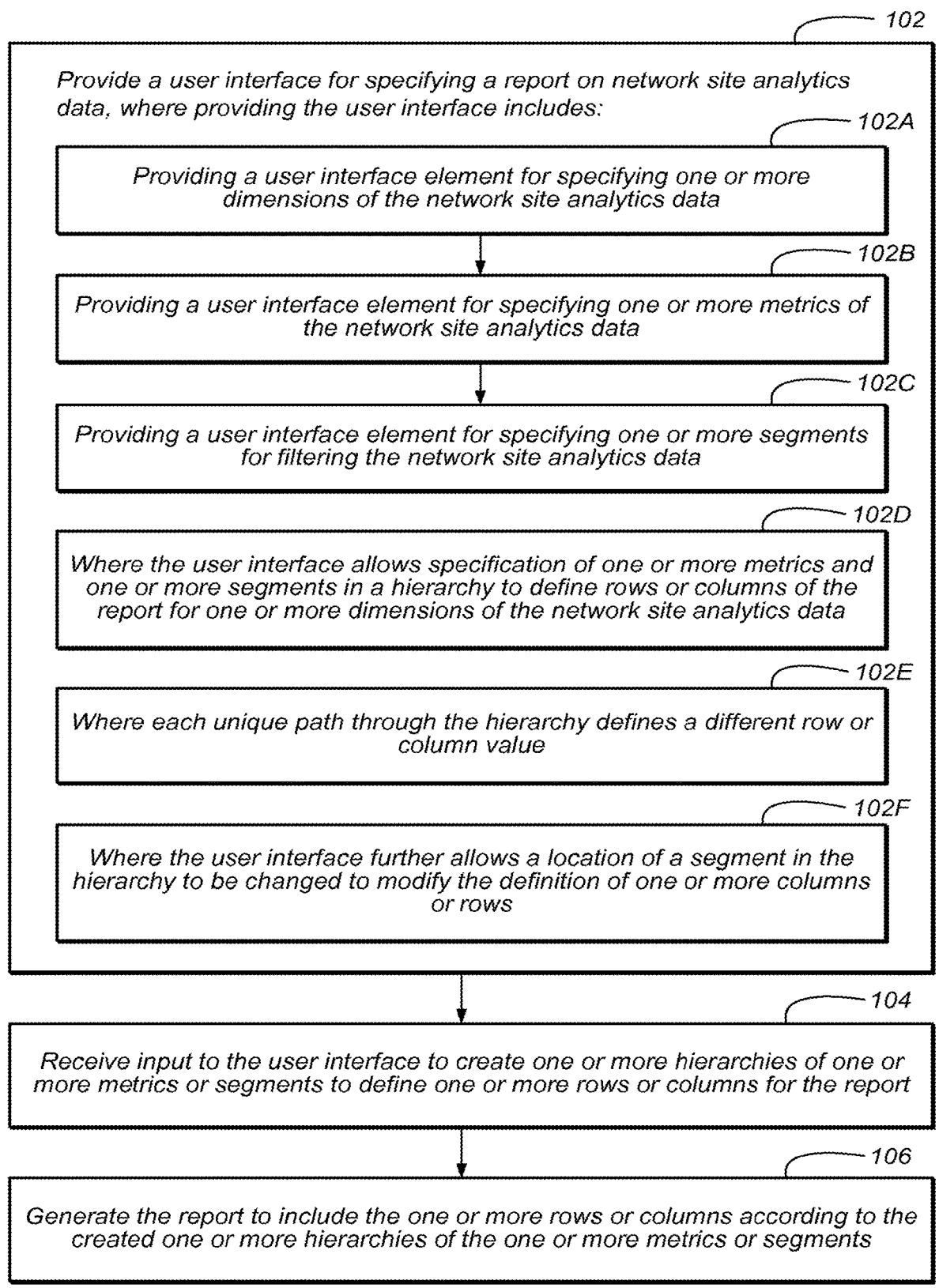
FIGS. 1A and 1B are flowcharts of selected elements of a report building tool, according to some embodiments.

FIG. 1A illustrates a flowchart highlighting example processing stages that may be present in an embodiment of a report building tool, where some of the processing stages correspond to the specification or generation of a report.

In this example, a user interface is provided for specifying a report on network site analytics data, as reflected in stage 102. Further, providing the user interface includes, (a) providing a user interface element for specifying one or more dimensions of the network site analytics data, (b) providing a user interface element for specifying one or more metrics of the network site analytics data, and (c) providing a user interface element for specifying one or more segments for filtering the network site analytics data, as reflected in sub stages 102A-102C.

The user interface elements for specifying dimensions, dimension items, segments, or metrics may pertain to different methods for building a report. In some cases, a user may add assets to a report builder interface, such as report builder interface 224 in FIG. 2B, with builder interface elements 224, 226, 228, and 240.

In other cases, a user may drag and drop assets from an area of the user interface where the assets is displayed onto a row or column of an already displayed report such that when the asset is dropped onto the report, the hierarchy defining the report is adjusted to accommodate the asset at the particular nesting corresponding to the location where the asset is dropped. For example, in FIG. 2F, metric 258, Single Page Visits, may be dragged from where Single Page Visits is displayed within the user interface, and dropped into the first column position indicated by the addition of the Single Page Visits 260 column in report 246. In one example, a user may click on Single Page Visits 258, and while maintaining the click, the user may drag the mouse the mouse such that the cursor is adjacent and to the left of the first column (defined by the Page Views metric and the Non-Purchasers segment), and once in this position, when the click is released or ended, Single Page Visits 260 becomes the new first column, and each existing column moves over by one column.

In this example, the user interface may allow specification of one or more metrics and one or more segments in a hierarchy in order to define rows or columns of the report for one or more dimensions of the network site analytics data, as indicated in element 102D. Further, each unique path through the hierarchy may define a different row or column, as indicated in element 102E. The user interface may further allow a location of a segment in the hierarchy to be changed to modify the definition of one or more columns or one or more rows of the report to be generated, as indicated in element 102F.

Figure 1B:
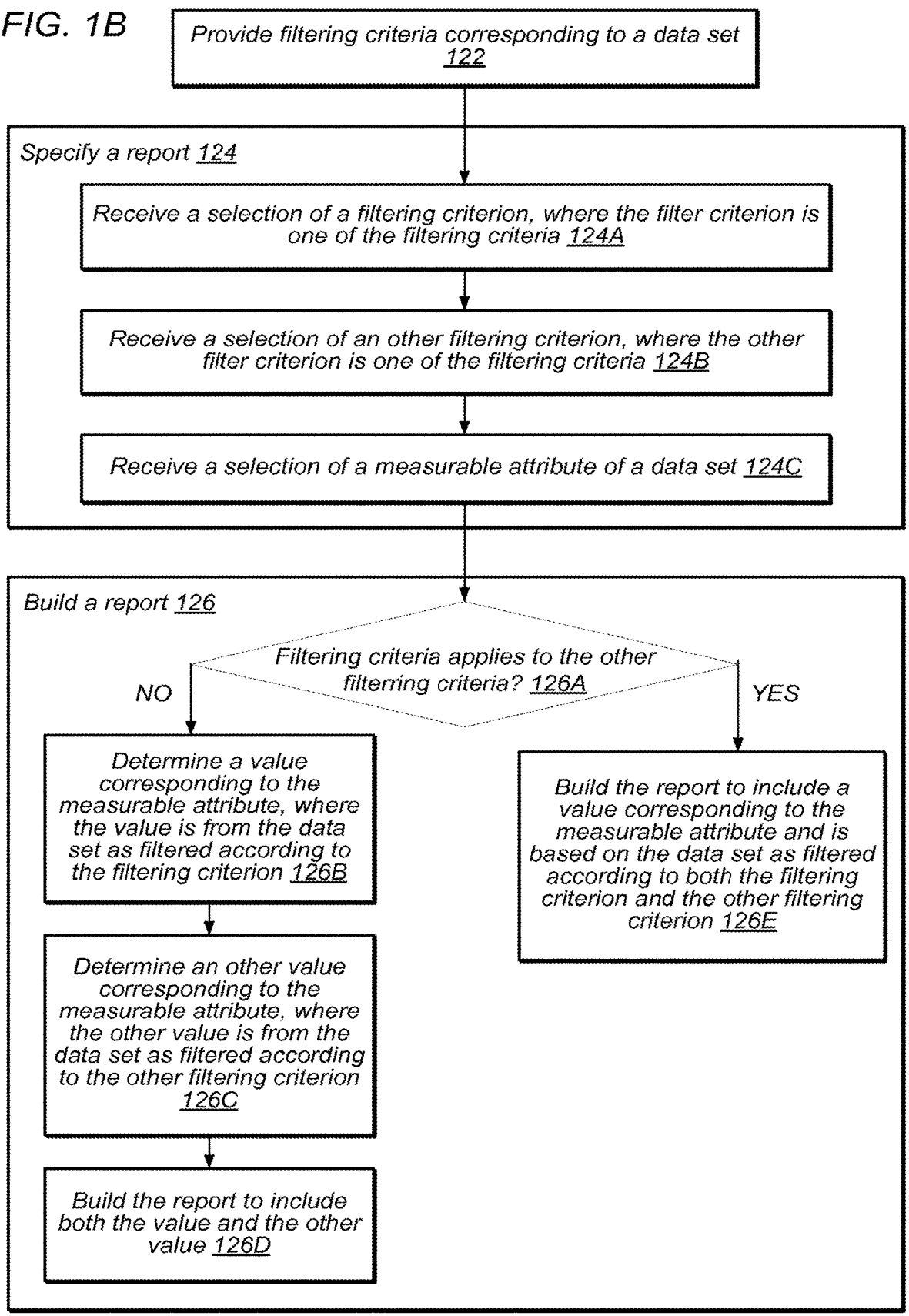
Figure 1C:
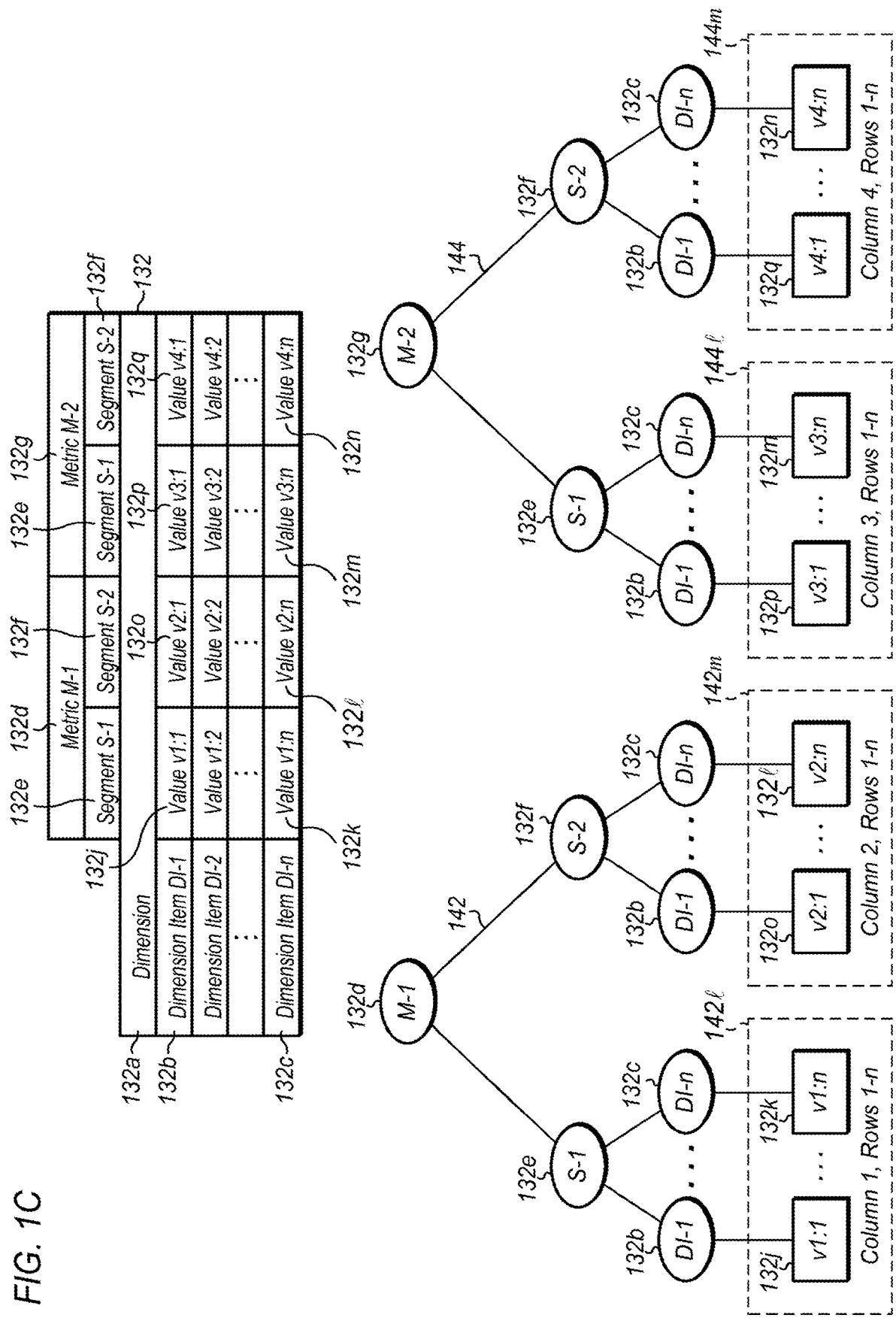
FIG. 1C depicts illustrations of a report and corresponding hierarchies, according to some embodiments.

In FIG. 1C, for example, a report 132 may be defined according to a combination of assets that may be represented according to hierarchies 1.42 and 1.44. Report 1.32 has a similar hierarchical structure as report 246 in FIG. 2E, where Metric M-1 132d corresponds to metric Page Views 210, Metric M-2 132g corresponds to metric Visits 248, Segment S-1 132e corresponds to segment Non-Purchasers 250, Segment S-2 132f corresponds to segment Purchasers 252, Dimension 132a corresponds to dimension Page 208, Dimension Item DI-1 132b corresponds to dimension item Home Page 212, and value v1:1 corresponds to report value 268, and where the remaining report values similarly correspond.

Further, report value v1:1 132j in report 132 may be a value from network site analytics data received from an analytics server, such that value v1:1 132j is a metric that quantizes an aspect of the network site analytics data across one or more dimensions of the network site analytics data, and specifically, in this example, report value v1:1 132j quantizes page views of the home page for non-purchasers who visited the web site.

As noted above, report 132 correspond to hierarchies 142 and 144. In general, the number of hierarchies that correspond to a given report may correspond to the minimum set of assets that span, specify, or define the entire report. In this case, Metric M-1 132d spans columns 1 and 2 and Metric M-2 132e spans columns 3 and 4, which are all the columns in the report and therefore assets Metric M-1 132d and Metric M-2 132e may be considered the minimum set of assets that span the entire report.

As seen in hierarchy 142, report value v1:1 132j corresponds to a path along nodes 132d, 132e, 132b, and 132j, which correspond to Metric M-1, Segment S-1, Dimension Item DI-1, and report value v1:1, which correspond to page views, non-purchasers, home page, and a report value, respectively. Therefore, as noted above in regard to report value v1:1 132j displayed within report 132, value v1:1 132j within hierarchy 142 corresponds to a number of page views of the home page for non-purchasers who visited the web site. Similarly, each leaf node in hierarchy 142 may correspond to each of the values within the cells of the report within columns 1 and 2, and each leaf node in hierarchy 144 may correspond to each of the values within the cells of the report within columns 3 and 4. In this way, each leaf node in each hierarchy may correspond to a single cell within a corresponding report. Further, each unique path through each of the hierarchies defines a unique combination of assets, and where the intersection of the assets produces a particular report value. Each unique path through each of the hierarchies also defines a different report value within the report. For example, unique path M-1, S-1, DI-1, v1:1 in hierarchy 142 corresponds to the cell containing report value v1:1 132j in report 132. Similarly, every unique path in hierarchies 142 and 144 corresponds to a respective, unique cell or report value within report 132.

Further, as discussed above, a report may have the property that a given asset may apply to less than an entire report, and this property may correspond to the scope of a given asset, where metric M-1 132d in FIG. 1C, which applies to visually spans columns 1 and 2, but does not apply to or visually span columns 3 and 4. The property of an asset applying to less than an entire report may also be determined from the structure of the one or more hierarchies for the report. For example, segment S-1 132e applies to column 1 and segment S-2 132f applies to column 2, and this corresponds to the two branches from metric M-1 in hierarchy 142. In other words, if each filter applied to the entire report, there would be only one hierarchy and there would be no branches. Therefore, according to hierarchies 142 and 144, when any given segment or asset is rearranged in the report, either through the report builder or through a drag and drop operation, the corresponding hierarchy is changed to match the new arrangement of the assets in the report. Further, the rearranged segment or asset in the report and the corresponding update to the hierarchy result in redefining the corresponding row or column in the report.

Continuing with the flowchart illustrated in FIG. 1A, at stage 104, input may be received through the user interface to create one or more hierarchies of one or more metrics or segments in order to define one or more columns for a report. As discussed above, these hierarchies may be created as a result of the particular arrangement, stacking, or nesting of assets in defining the report through the report builder interface or through dragging and dropping assets into the report.

Given the one or more hierarchies for the report, the report may be generated to include the one or more rows or columns as defined according to the hierarchical structure of the one or more metrics, segments, or other assets, as reflected in stage 106.

In generating the report, the report building tool may either retrieve the necessary data for building the report from a locally stored portion of the network site analytics data or the report building tool may retrieve the necessary data for building the report remotely from an analytics server, such as analytics server 506 in FIG. 5. For example, if an existing report includes three segments used to filter report values, and one particular column is defined according to only a single one of the segments, then if one of the two other segments is stacked on top of the particular column, then the report values in the particular column may be filtered according to two segments instead of one. In this example, since the data set for satisfying the particular column has been narrowed (two filters instead of one filter), then no additional data would be necessary for generating a new report and therefore the new report may be generated from locally stored network site analytics data that has been previously downloaded. Otherwise, for example if a new segment is added creating a new column, then the report building tool may determine that the data to generate an updated report does not exist locally, and the report building tool may access the remote analytics server to retrieve the data necessary for updating the report. The report building tool's determination of whether local data may be used to update a report may result in a reduction of network bandwidth and increased responsiveness in generating an updated report.

FIG. 1B illustrates a flowchart highlighting example processing stages that may be present in an embodiment of a report building tool, where some of the processing stages correspond to the specification and generation of a report. In this example, given a user interface provided by the report building tool, a user may select user interface elements corresponding to various filtering criteria provided through the user interface, as reflected in stage 122. The user may also select a data set, which the report building tool may use as a basis for building a report, and where the data set corresponds to the filtering criteria and may be organized according to the various filtering criteria. For example, a data set may be organized according to fields or dimensions with one or more entries per field, such as dimension items. Further, the data set may include measurable attributes, or metrics.

Given the user interface of the report building tool, a user may specify one or more filtering criteria and one or more metrics from which a report may be generated, as seen within the subelements of stage 124. An example interface may be seen in interface window 200 in FIG. 2A.

From the report building tool user interface, a user may select a filtering criterion, where the filtering criterion is one of the filtering criteria provided through the user interface, as reflected in stage 124A. For example, a user may select a "BROWSERS" dimension, as seen in FIG. 3A, stage 314. A user may further select another filtering criterion such as a segment or another dimension, as reflected in element 124B. For example, a user may select a "PURCHASERS" segment, as seen in FIG. 3C, element 338. A user may further select one or more metrics, or measurable attributes of the data set, as reflected in stage 124C. For example, a user may select a "VISITORS" metric, as seen in FIG. 3C, element 339.

Once a user has specified a report, the user may build the report, as reflected in element 126 and subelements 126A-126E of FIG. 1. Depending on whether or not the user has specified the filtering criterion to apply to the other filtering criterion the report building tool may generate a report with one or two values corresponding to the measurable attribute. This conditional case is depicted in stage 126A.

In the case that the other filtering criterion is not specified to apply to, or filter, the filtering criterion, the report building tool adds a value corresponding to the filtering of the metric according to the filtering criterion and also adds a value corresponding to the filtering of the metric according to the other filtering criterion, as per stages 126B-126D. To this end, the report building tool determines a value corresponding to the measurable attribute, where the value is from the data set as filtered according to the filtering criterion, as reflected in element 126B. Further, in this example the determined value is not from the data set as filtered according to the other filtering criterion. The report building tool also determines a value corresponding to the measurable attribute, where the value is from the data set as filtered according to the other filtering criterion, as reflected in element 126C. In this case, where the other filtering criterion does not apply to the filtering criterion, the report is built to include the values determined as per elements 126B and 126C, as depicted in stage 126D.

As an example of the other filtering criterion not applying to the filtering criterion may be found within FIG. 3A. In this example, it may be the case that a user has already added the "BROWSERS" dimension 314, and the specification of a table beginning at element 124 corresponds to the addition of two segments, segment "PURCHASERS" 338 and segment "LOYAL VISITORS" 337 of FIG. 3C. In this example, both segments were added in adjacent columns stacked beneath the "VISITORS" 339 metric. Given that each segment corresponds to its own column, each metric value in the column is filtered according to its respective column segment and according to the "BROWSERS" dimension. In this example, the determined value as per stage 126B would correspond to value 342, or 1,399,111 visitors that are loyal visitors using browsers. In this example, the determined value as per stage 126C would correspond to value 341, or 118,115 visitors that made a purchase using a browser. In this example, each of these values would be added to the report.

As another example where a single metric, or measurable attribute, may be filtered according to more than one filtering criteria, a user may stack segments directly on top of each other such that multiple segments provide the filters for a single column of a report. Referring again to FIG. 3C, as depicted, table cell 341 corresponds to "VISITORS" metric 339 as filtered according to both the "BROWSERS" dimension 314 and "PURCHASERS" segment 338. However, instead of, or in addition to adding "LOYAL VISITORS" segment 337 in a column adjacent to the column for the "PURCHASERS" segment 338, a user may have stacked "LOYAL VISITORS" segment 337 beneath "PURCHASERS" segment 338 within the same column. In this example, the single cell 341 would represent "VISITORS" metric 339 as filtered according to a dimension and two segments. The report building tool does not place any restriction on the quantity of segments that may be stacked, and further, there are no restrictions on heterogeneous stacking of dimensions, dimension items, and segments.

In the case that the other filtering criterion applies, or filters, the filtering criterion, the report building tool adds a value corresponding to an intersection point in the table of the two filtering criteria. In other words, the report is built to include a value corresponding to the measurable attribute, where the value would be based on the data set as filtered according to both the filtering criterion and the other filtering criterion, as per stage 126E. Further, in this example, the report includes at least a portion that is not filtered according to at least one of the filtering criterion or the other filtering criterion. In this example, the limited scope of the application of a given filtering criterion is contrary to prior art methods where filters simply apply to all elements of a report. In this example, the limited scope of the application of a given filtering criterion is contrary to prior art methods where filters simply apply to all elements of a report.

In this case, where the other filtering criterion does apply to the filtering criterion, an example may be found within FIG. 3C. As described above with regard to FIG. 3C, the two filtering criteria are a "BROWSERS" dimension along a row and a "PURCHASERS" segment along a column, and the metric is "VISITORS". In this example, the dimension and segment intersect at element 341 of FIG. 3C, in which the segment applies a filter to the metric along the column corresponding to the segment and the dimension applies another filter at the intersection point 341. In other words, in this example, of all visitors, there are 118,115 visitors that purchased using browsers.

In some embodiments, the title bar panel corresponding to a given asset, such as the title bar panel for "VISITORS" 339, may include an icon indicating that the title bar panel may be dragged to a different location, or to a different position in the hierarchy. For example, given the two columns and three assets of assets 337, 339, and 338 of FIG. 3C, a user may click and hold on a corner, or any other portion, of the title bar for Purchasers 338, and the user may then drag the title bar for Purchasers 338 to a position in the report corresponding to the area indicated by element 398. In this way, a user may add a segment between Visitors 339 and Loyal Visitors 337, resulting in a new hierarchically stacked set of assets: Visitors 339>Purchasers 338>Loyal Visitors 337, and another result is the collapsing, or disappearance of the column corresponding to the Purchasers 338 segment. In this way, a segment or any other asset may be dragged into a new hierarchical position. For example, if instead of the hierarchically stacked columns of FIG. 3C being organized as: [COLUMN x] Visitors 339>Loyal Visitors 337, and [COLUMN x+1] Visitors 339>Purchasers 338, the hierarchically stacked columns were organized as: [COLUMN x] Visitors 339>Loyal Visitors 337, and [COLUMN x+1] Purchasers 338. In other words, column x had two stacked assets and column x+1 has one stacked asset, in this case a user can drag the title bar for Visitors 339 over an area above Purchasers 338, and the result would be stacking an asset on top of Purchasers 338. In a similar way, hierarchically nested rows may be shuffled and modified.

Example Embodiment: Report Building Tool

Figure 2A:
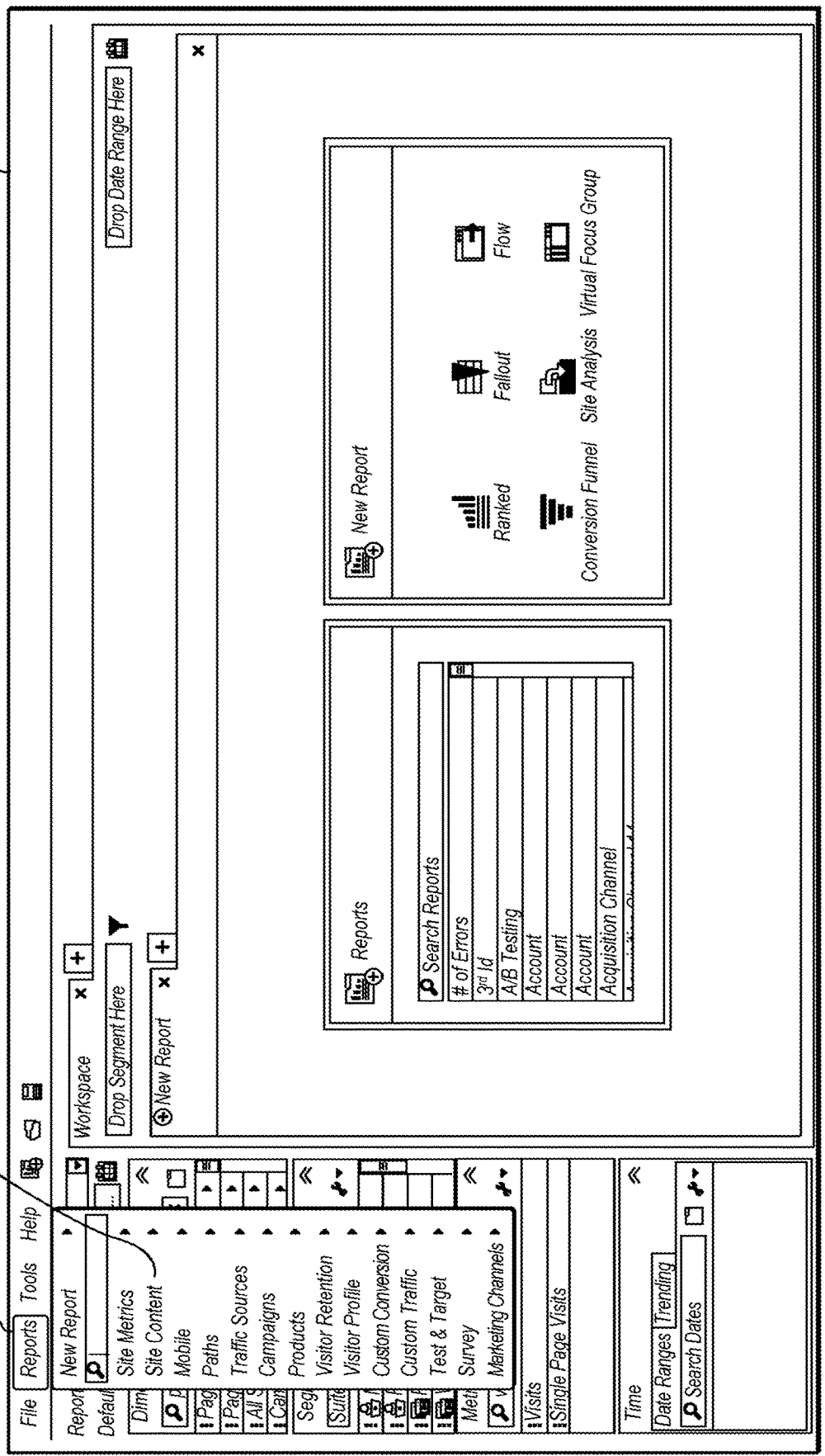

FIG. 2A illustrates an embodiment of a user interface of the report building tool which allows a user to generate a default report and subsequently modify the report. The user interface window of the report building tool in this embodiment is represented by window 200. Before generating reports, a user may first specify a content site for which the report building tool may access a data set. This may be done with a user directing the report building tool to log in to, for example, an analytics server and to specify a content site. In other embodiments, the data set may be accessible locally, or at one or more remote storage locations.

To begin, in this example, a user may select the Reports 202 menu option, and from the displayed menu, the user may select the Site Content 204 option, from which the user may ultimately select a dimension. In this example, a user selects a pages dimension, and the pages dimension may be used to break down or filter the analytics data according to various pages of a content site. The Site Content 204 option is one of many other options a user may choose to build an initial report, including site metrics, mobile, paths, traffic sources, campaigns, products, visitor retention, visitor profile, custom conversion, custom traffic, test & target, survey, marketing channels, among other potential options, including the option the generate a report from scratch.

Figure 2B:
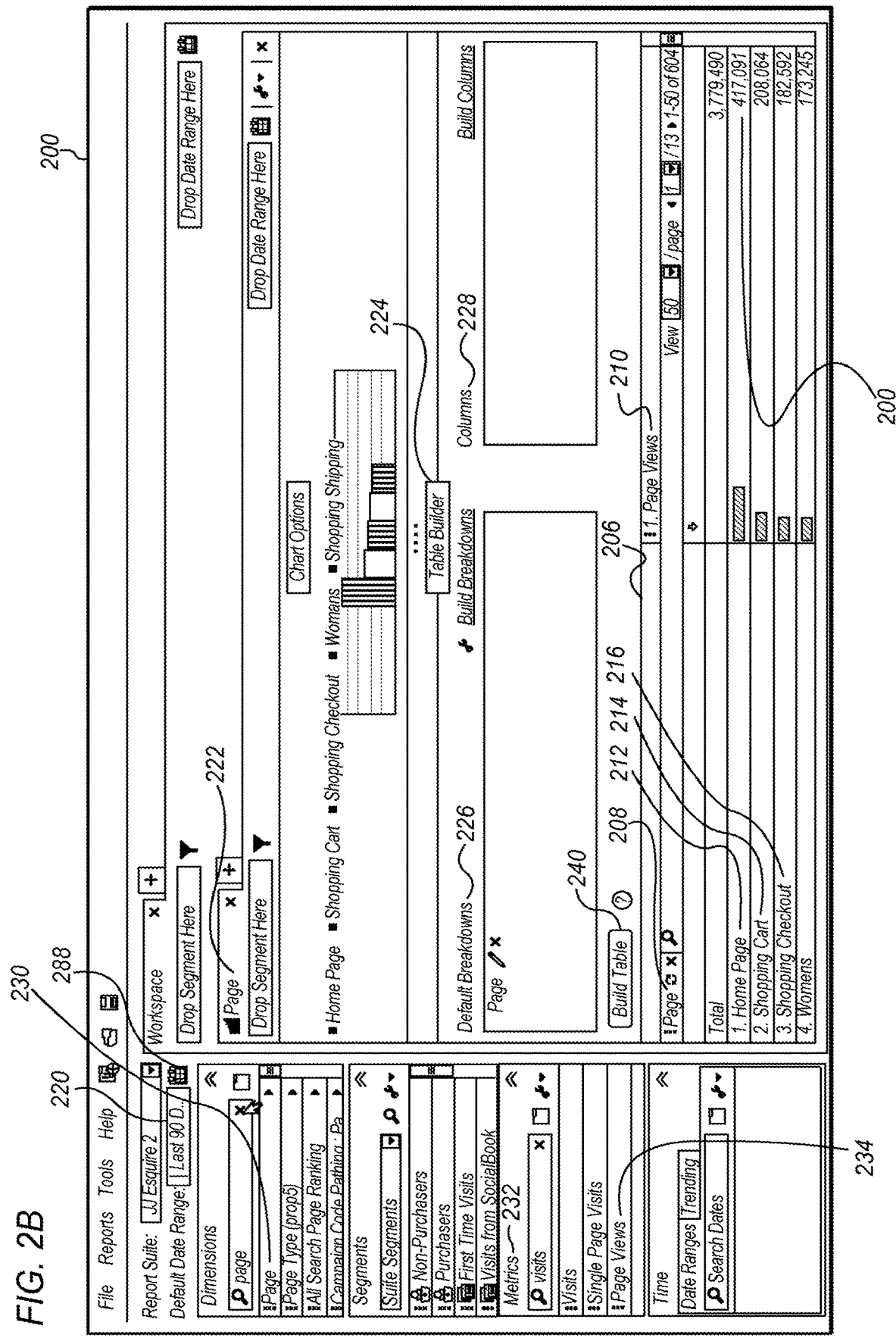

FIG. 2B illustrates the same report building tool window 200 after a report 206 of the analytics data for a content site for the Page dimension has been generated. Report 206 initially includes a Page 208 dimension and a Page Views 210 metric. Page 208 dimension is displayed at the top of a column that includes example pages, such as Home Page 212, Shopping Cart 214, and Shopping Checkout 216. The Page Views 210 metric is displayed at the top of a column that includes numerical measures corresponding to the dimension items corresponding to Page 208, including dimension items 212-216. For example, in this report, Home Page 212 corresponds to Page View 210 metric, meaning that the home page of the content site had 417,091 page views. The default date range in this report is the last 90 days, as indicated by date range 220. Date range 220 corresponds to date icon 288, where selection of the date icon may display a user interface allowing a user to further define date information corresponding to the report, which is discussed below. Therefore, the home page for the content site has received 417,091 page views in the past 90 days. The date range of the report is modifiable at any time.

Included in the creation of the report is the creation of the Page 222 tab within which the report 206 is displayed. Within the Page 222 tab is also displayed a Table Builder 224 icon, which when clicked in this embodiment, displays the Default Breakdowns 226 panel and the Columns 228 panel. In response to the creation of the report 206, the Default Breakdowns 226 and Columns 228 panels are populated corresponding to the generated report. Page 230 corresponds to Page dimension 208, and Metrics 232 includes the Page Views 234 metric corresponds to the Page Views 210 metric.

In addition to the generated report 206 depicted in FIG. 2B, a user may choose to further manipulate the analytics data in search of a pattern, or trend, or to otherwise understand how viewers of the content engage with the content site. In one embodiment, to introduce additional dimensions, segments, or metrics, a user may click on the Table Builder 224 icon within the Page 222 tab created when the initial report was created. In other embodiments, the Default Breakdowns 226 and Columns 228 panels may be displayed by default and a user may immediately begin to introduce dimensions, segments, and metrics to the Default Breakdowns 226 and Columns 228 panel after a report is generated.

In different embodiments, the table builder user interface panel may have different formats. For example, in some embodiments, the table builder user interface panel may have user interface elements similar to those depicted in FIGS. 2B-2D, where a user may drag and drop assets into either the Default Breakdowns 226 panel or the Columns 228 panel such that the assets are displayed in a hierarchically organized and nested manner, as in FIG. 2D. Further in this embodiment, a given asset may be dropped into a particular hierarchical nesting based on the position into which the asset is placed with respect to already-displayed assets.

In other embodiments, the table builder user interface panel may have user interface elements similar to those depicted in FIG. 2J, where the assets that make up the report are displayed in a left-tab view. The particular display of a preferred user interface format may be determined through a specification of a user preference. In either configuration of the table builder user interface, the functionality and flexibility of arranging assets is the same.

Figure 2C:
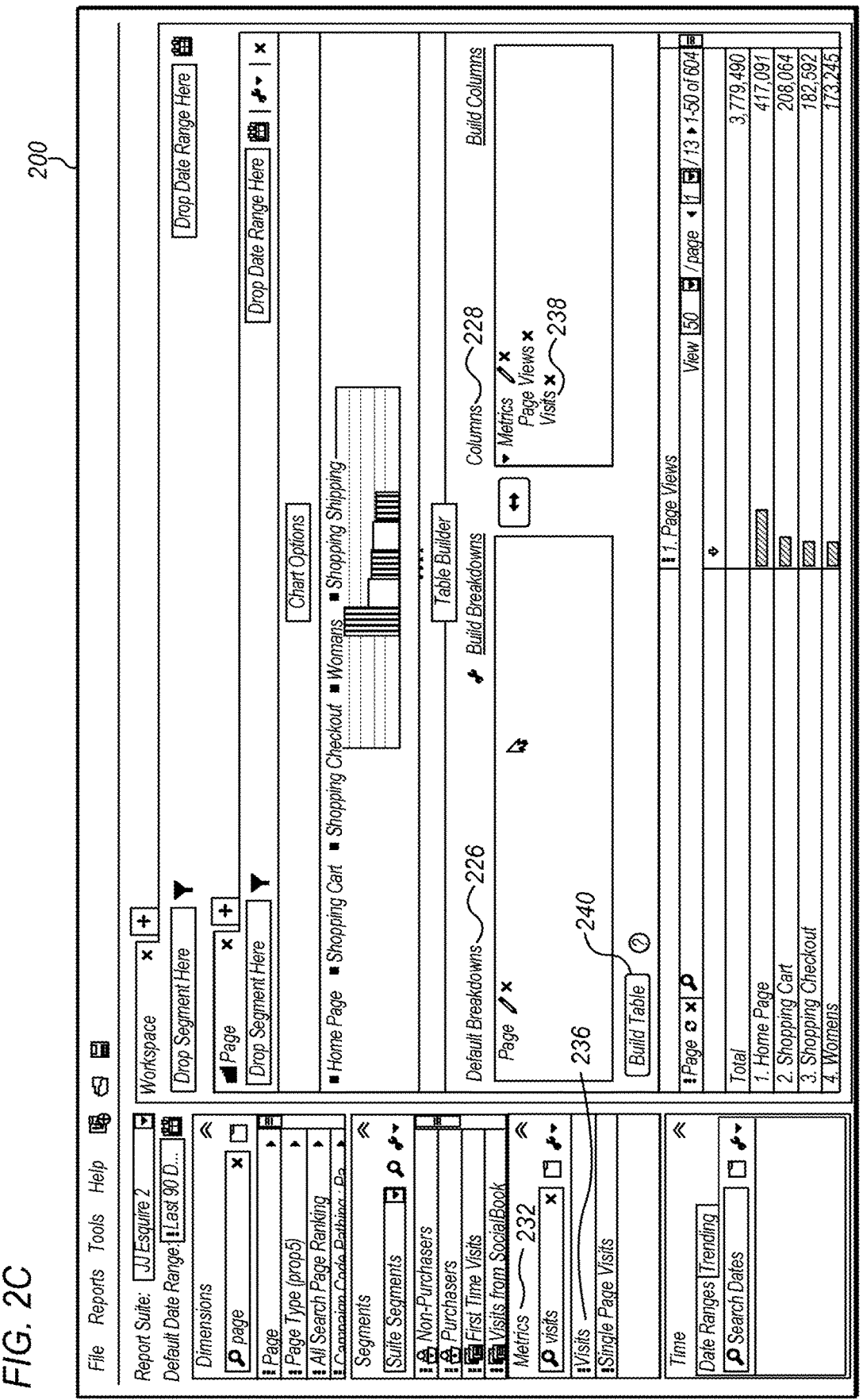

FIG. 2C illustrates a result in this example of a user having clicked on Visits 236 within Metrics 232 panel, and dragged Visits 236 into the Columns 228 panel of the Table Builder 224 interface panel. In this example, in response to dragging Visits 236 into the Columns 228 panel, a new metric is introduced into the Columns 228 panel, as depicted by Visits 238. In other example, the new metric is not added to the report until Build. Table 240 icon is selected. This process may be repeated indefinitely, with a user adding any number of dimensions, segments, and metrics to the Default Breakdowns 226 and Columns 228 panels. At some point, a user may wish to see the result of the new table, and the user may then click on Build Table 240 icon to generate a new report.

Figure 2D:
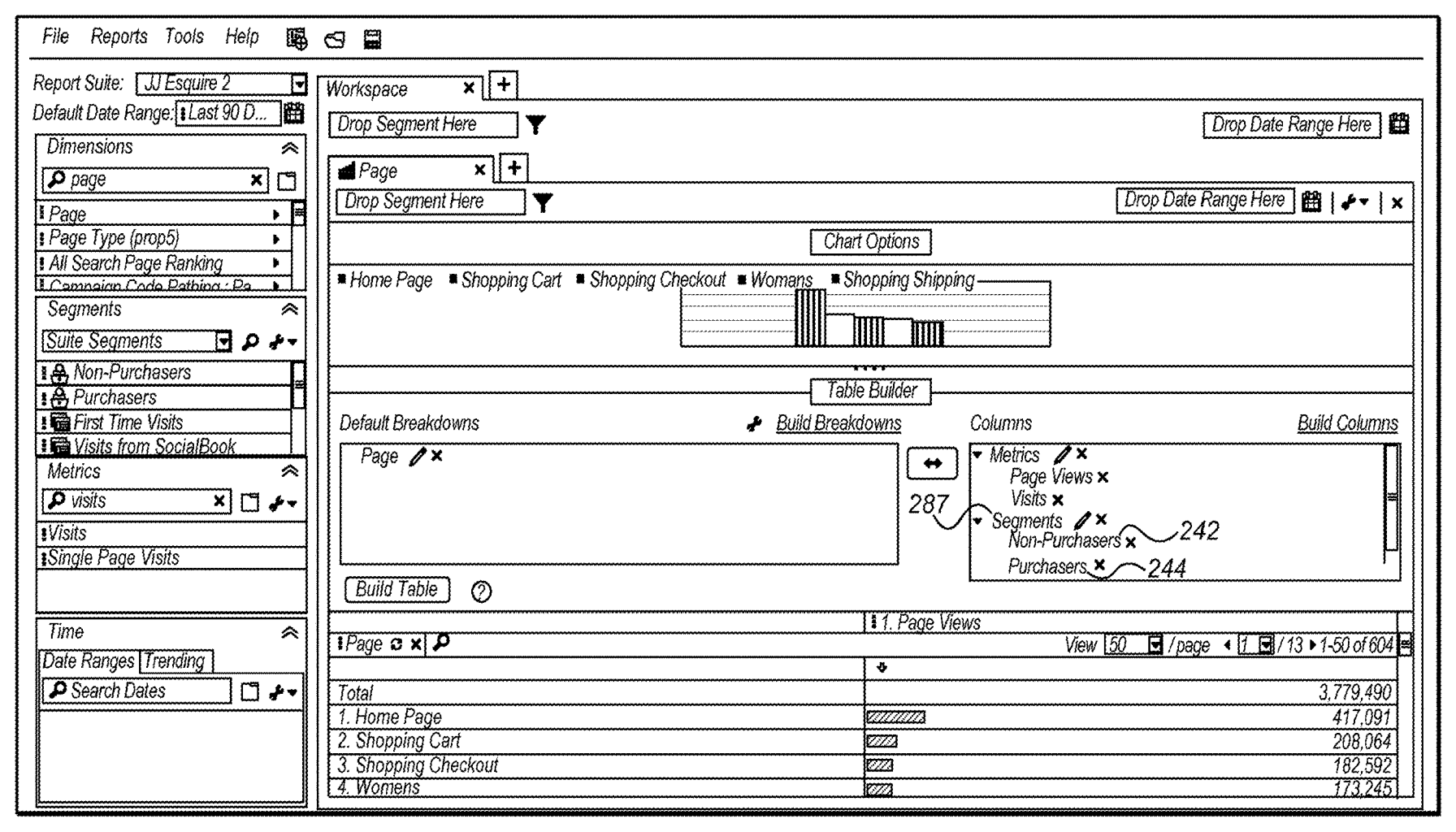

However, in this example, further customizations are performed before a new report is generated. FIG. 2D illustrates the addition of two segments into the Columns 228 panel, segments Non-Purchasers 242 and Purchasers 244. Since these two segments are the first introduced into the Columns 228 panel, a top-level Segment 287 indicator is created within the Columns 228 panel. Nested within the Segment 287 level are the two new segments, Non-Purchasers 242 and Purchasers 244.

Figure 2E:
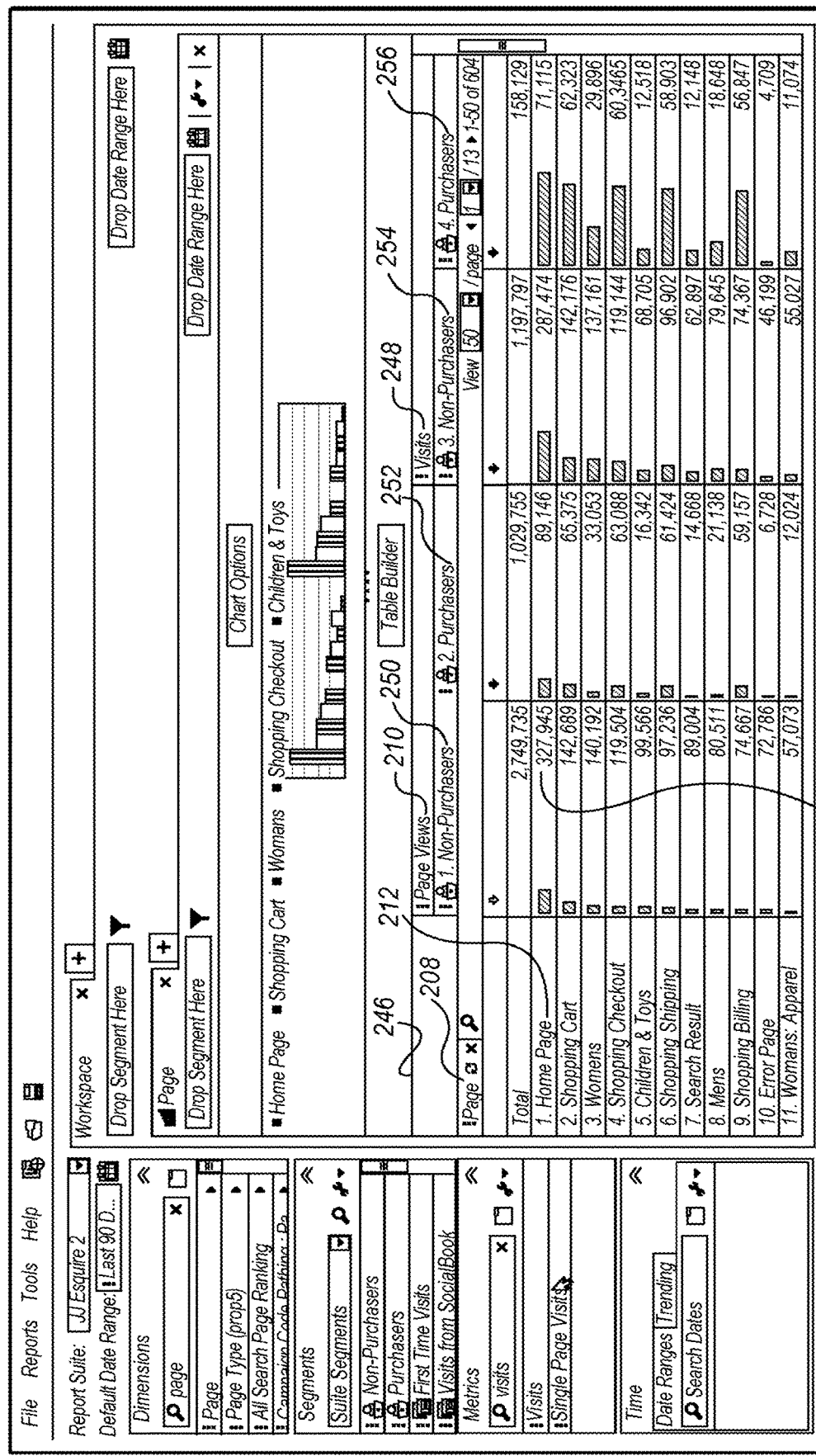

Further in this example, FIG. 2E illustrates the result of a user having clicked the Build Table 240 icon. At this point, report window 206 may be updated in accord with the options specified in the Table Builder 224 panel discussed above. As compared to the initial report, seen in report window 206 of FIG. 2B, report window 246 of FIG. 2E includes the additional metrics and segments introduced through additions to the Default Breakdowns 226 and Columns 228 panels. Thus, where the report window in FIG. 2B included Page 208 dimension items along the rows and Page Views 210 as the only column, report window 246 in FIG. 2E includes Visits 248 metric. Further, beneath each of the metrics, Page Views 210 and Visits 248, are the two newly introduced segments. In other words, for Page Views 210 there are the two filtering segments Non-Purchasers 250 and Purchasers 252, and for Visits 248 there are the two filtering segments Non-Purchasers 254 and Purchasers 256.

FIG. 2J illustrated is an embodiment of a table builder user interface 287, as discussed above. In contrast to the table builder user interface 224 of FIGS. 2B-2D, the displayed assets are arranged in a left-tab view, as depicted according to elements assets 288 and 289. In this table builder user interface, Rows/Breakdown 288 panel corresponds to Default Breakdowns 226 panel in FIG. 2B, and Columns 289 panel corresponds to Columns 228 panel in FIG. 2B. Summary 290 panel provides a summary of the assets to be used in constructing a report, where element 293 corresponds to Rows/Breakdown 288, and where element 294 corresponds to Columns 289. Further, the Summary 290 panel provides information regarding each of the elements, for example, under the Rows/Breakdown summary 293, the summary indicates that for dimension "Day", 90 rows are to be generated, which may correspond to the previous 90 days. In regard to dimension Day 291, Breakdown 296 indicates a value to use in determining a quantity of dimension items to display.

As with the table builder user interface in FIGS. 2B-2D, assets may be dragged and dropped into the Rows/Breakdown 288 panel or Columns 289 panel. At the point that each asset has been added, and a report is desired, a user may select the Replace Table 295 icon in order to replace the currently displayed table with the table corresponding to the selection made within the table builder user interface.

Figure 2F:
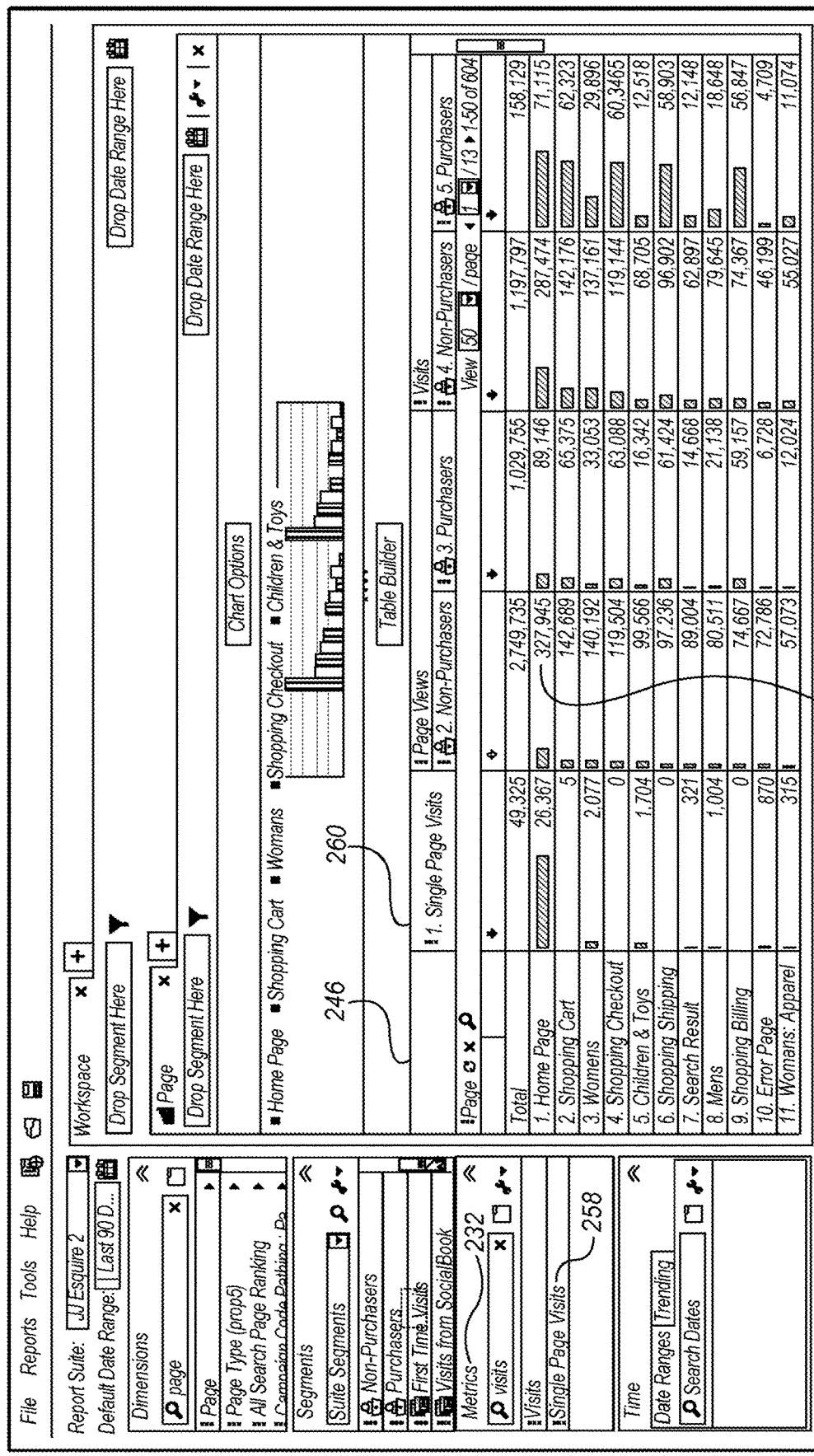

FIG. 2F illustrates an alternate, dynamic manner in which a user may modify or update a generated report. As depicted in report window 246, a user has added a column to the generated report corresponding to Single Page Visits 258 metric. In this example, Single Page Visits 260 metric is introduced to the generated report in response to a user having clicked over Single Page Visits 258 in the Metrics 232 panel, and dragged Single Page Visits 258 into position within the generated report. In response to the addition of Single Page Visits 258 to the generated report, the report is dynamically updated with corresponding analytics data.

Figure 2G:
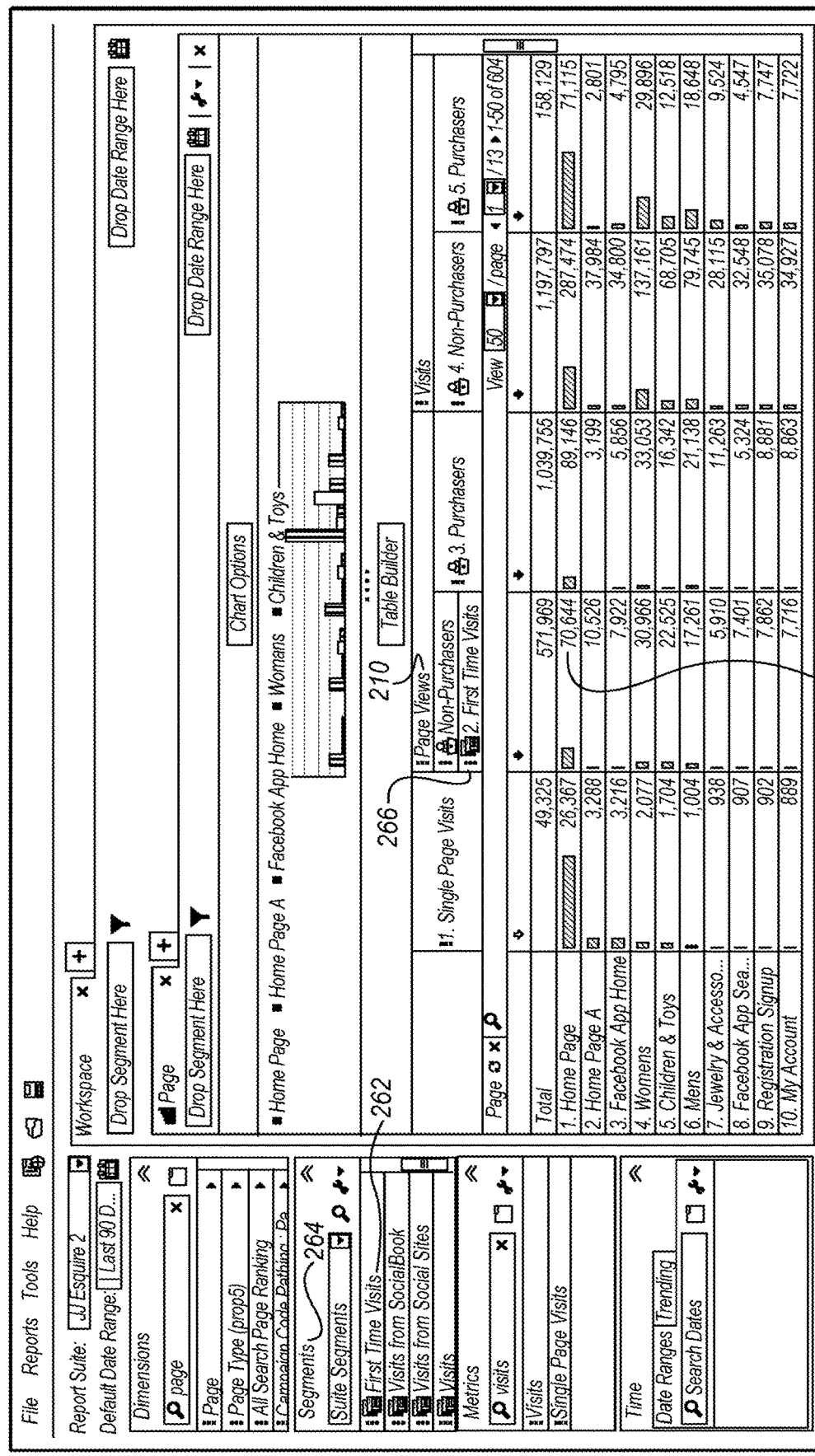

FIG. 2G further illustrates a report modified in response to a user dragging a First Time Visits 262 segment from within the Segments 264 panel into position within the report, as depicted by First Time Visits 266. In this manner, in this example, a user is able to stack, or nest, the First Time Visits 262 segment within the Page Views 210 column. Again, in response to the addition of the First Time Visits 262 segment, the report is dynamically updated. To illustrate an element of the update, cell 268 of FIG. 2F, prior to the addition of the First Time Visits segment is equal to 327,945, meaning that page views of non-purchasers of the home page totaled 327,945 over the past 90 days. By contrast, cell 270 of FIG. 2G after the addition of the First Time Visits segment is equal to 70,644, meaning that page views of non-purchasers of the home page, where the viewers of the page are also first time visitors totaled 70,644 over the past 90 days. Further, as easily as the new First Time Visitors 262 segment was introduced by dragging the segment into the report, any segment or metric may also be removed by dragging a given segment or metric out of the report.

Figure 2H:
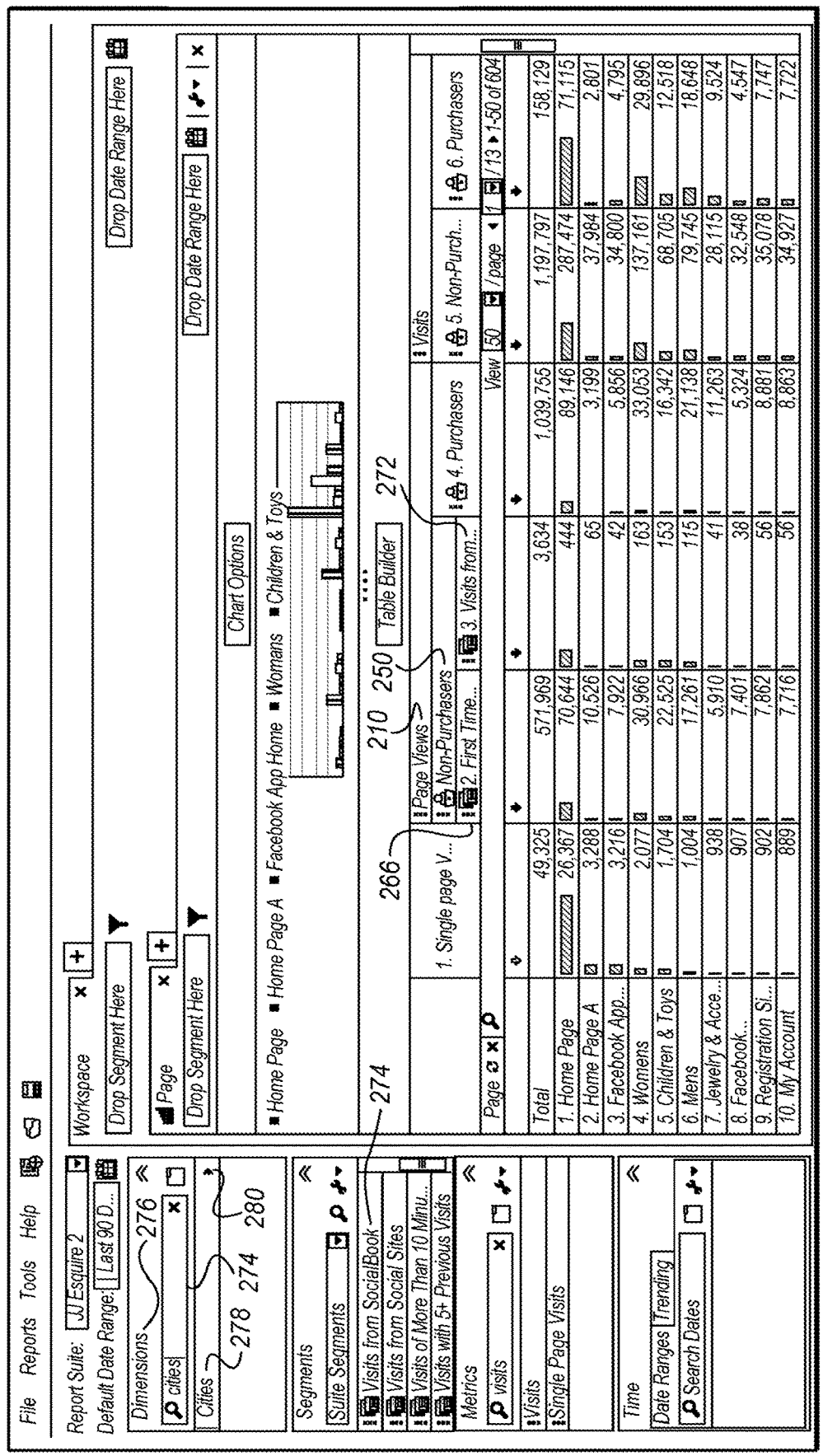
Figure 21:
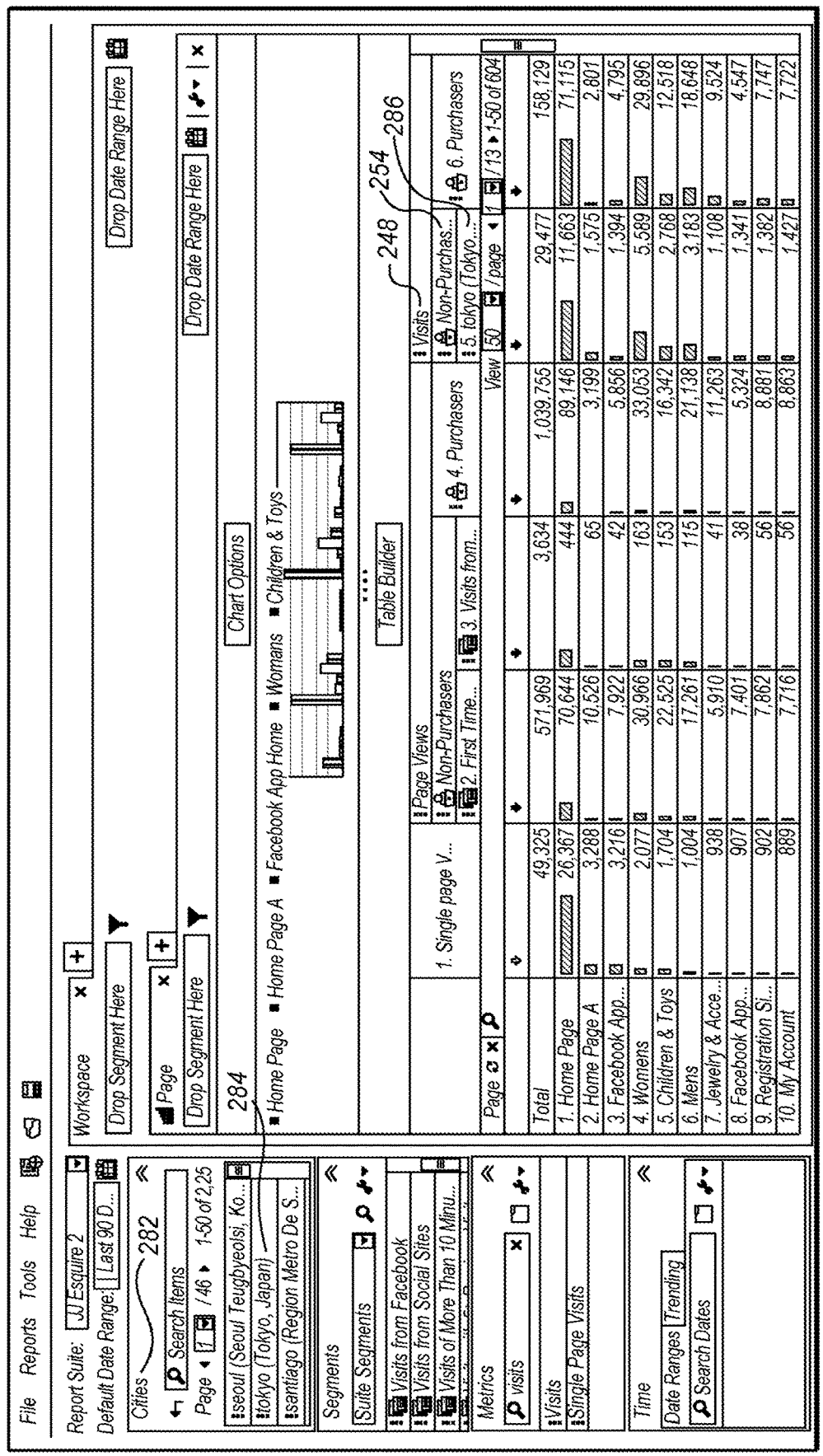

FIG. 2H illustrates the addition, in this example, of another segment to further filter Page Views 210. The new segment, Visits from SocialBook 272, is nested under Page Views 210 and Non-Purchasers 250, creating a corresponding, new column. In another example, Visits from SocialBook 272 could have been added beneath First Time Visits 262, which would not have resulted in an additional column. Instead, if Visits from SocialBook 272 has been added underneath First Time Visitors 262, an additional filter would have been added to the results of the existing column, resulting in report results reflective of page views from non-purchasers, where the non-purchasing page views are from first time visitors that also come from visiting the SocialBook web site.

FIG. 2H also illustrates the search for a dimension, where the user types in word into search box 274 of the Dimensions 276 panel. In this example, the search result narrows the displayed dimensions to only one dimension, Cites 278. Further, corresponding to the Cities 278 dimension is an arrow 280 that may be selected to drill down into the dimension and display one or more dimension items corresponding to a given dimension.

FIG. 2I depicts a partial list of cities displayed in response to a user clicking icon arrow 280 is displayed within the Cities 282 panel. From the list of cities, corresponding to the dimension items of the cities dimension, a user has dragged Tokyo 284 from the Cities 282 panel into the column under the Visits 248 metric in the report window. In response to the addition of the Tokyo 286 dimension item, the column corresponding to the Visits 248 metric is updated, and the Tokyo 286 dimension item is added onto the stack displayed beneath the Visits 248 metric. As with the addition of assets described earlier, in response to the addition of the Tokyo 286 dimension item, the existing column under Visits 248/ Non-Purchasers 254 is further filtered according to the addition of the newly added asset.

Example Embodiment: Report Building Tool

FIG. 3A illustrates a portion of a report within a user interface window of the report building tool. The complete report includes the portions from FIGS. 3B and 3C. The user interface window of the report building tool in this embodiment is represented by window 300. The portion of the report in FIG. 3A includes options for selecting dimensions, segments, and metrics. The portion of the report building tool user interface in FIG. 3A further includes a workspace panel 350 within window 300, where the generated report is displayed within workspace panel 350.

In different embodiments, the generated report may have different formats for indicating a hierarchical structure of assets. For example, in some embodiments, the report generated may indicate nesting levels of rows similar to the nesting of rows depicted in FIG. 3A, where a nesting level is indicated such that an asset is displayed at one level such as dimension item 315, and a nested level is displayed such that the scope of dimension item 315 is indicated by indentation of nested assets such as page dimension 316.

In other embodiments, the generated report may have a format for indicating a hierarchical structure of assets as depicted in FIG. 3E, where the nested scope is indicated according to an visual effect where it appears similar to a sub report displayed within the report. For example, within the scope of dimension item 399B of the "Browsers" dimension is a nested page dimension 399C, indicating particular pages. The rows and columns defined according to the hierarchy of assets 399B and 399C may be seen within the report area 399D. Further in this embodiment, for each of the rows for page dimension 399C, the corresponding rows for dimension item 399B display grayed out text for the dimension item 399B "Microsoft Internet Explorer 9".

The particular display of a preferred user interface format may be determined through a specification of a user preference. In either configuration of the report display format, the functionality and flexibility of arranging and displaying assets is the same.

Returning to FIG. 3A, Dimensions 301 is a panel within the report building tool window 300 which allows a user to search for and select a dimension or dimension item to add to a report. A search box 302 allows a user to search for a specific dimension or dimension item. Within the dimensions panel 301 is a list of example dimensions 303 and 304. Dimension 303, a page dimension, may be introduced into the report when a user would like to see page items, such as those listed under the page dimension 316, nested under dimension item 315, a browser item, within this example report. Dimension 304 may similarly be placed within a report at any nesting level of the rows.

In this example, items 313 are dimension items corresponding to the browser 314 dimension, which corresponds to browser types, such as dimension items 315, 318, and 323. While the rows visible within this example are all dimension items corresponding to the browser dimension, in other cases, multiple dimensions may be added to the rows of the table of the report. For example, at the end of the last row of dimension items corresponding to the browser dimension, a user may click and drag one or more of the dimensions within dimensions panel 301 into a row of the table. A way to do this may be to scroll down to the last dimension item of dimension 314 and drop the dragged dimension onto an empty row. Another way is to minimize the display of dimension items, for example, by clicking on the "+" icon adjacent to the browser 314 dimension in order to view empty rows.

Segments 305 is a panel that allows a user to scroll through or search for a particular segment or segments, such as segment All Visits 307, among others. Search entry box 306 allows a user to perform a keyword search for a particular segment or group of segments. The report building tool places no restrictions on where within a table a segment may be added, either with regard to which hierarchical level the segment is introduced, or to what asset the segment is applied to, including other segments. For example, dimension item 318 has been filtered with the application of segments All Visitors 320, First Time Visitors 321, and Loyal Visitors 322, which are displayed under segment header 319.

Metrics 308 is a panel that allows a user to scroll through or search for a particular metric or metrics, such as metric Time Spent per Visit 310, among others. Search entry box 309 allows a user to perform a keyword search for a particular metric or group of metrics. Similar to segments and dimensions, a metric or set of metrics may be added at any place or at any hierarchical level of a report. For example, metrics 325-327 have been added under dimension item 323, allowing, a user to see in the table the number of visitors attributable to content viewers using Mozilla® FireFox® 3.5, among other metric values.

In some embodiments, the report building tool may restrict the nesting of a metric under another metric. Because a metric may correspond to a number, this restriction on nesting metrics prevents a single cell within the table from being associated with two possibly different numerical values.

In other embodiments, a user may choose to have the option of combining metrics to have a cell within a table correspond to some combination of the metrics. For example, given three metrics that correspond, respectively, to visitors with IP addresses in California, Texas, and New York, a user may wish to combine these values into a single entry in a cell of a table in a report to view the number of visitors from three of the most populous states in the United States. In some cases, it may not make sense to combine metrics, such as when one metric is a measure of time spent per visit and another metric is a measure of the number of page reloads. In such cases, if a user is attempting to combine metrics with different units of measurement, the report building tool may issue a warning to the user indicating the problem. In other cases, a user may be provided with an option to specify how multiple metrics are to be combined. For example, in the case above where number of IP addresses from selected states are to be combined, a user may specify that the values are to be added. In other cases, a user may specify that values are to be subtracted, for example, when the two metrics are first time visitors and loyal visitors a user may specify that the value to be displayed is first time visitors minus loyal visitors. In other cases, a user may specify that one or more set operations are to be performed, such as a set union or intersection. Further, a user may be given the option to rename the row entry corresponding to the combined metrics, or a default behavior may be for the report building tool to simply display each metric combined.

FIGS. 3B and 3C depict various asset combinations related to defining the columns of a table in a report. Asset combinations may be stacked to allow a user to specifically define the focus of the analytics data the user for which the user is interested. In this example, each of the three columns is specified by a combination of three assets, a Custom Link Views 328 metric, an All Visits 329 segment, and a particular date dimension item, such as data dimension item 330 corresponding to May 15, 2011. In other words, for a given one of the three columns, three assets have been stacked, a metric, a segment, and a dimension item. In other cases, a user may stack an unlimited amount of additional segments and dimension items for a given column within the table. As discussed above, in a default case, only one metric is allowed to be stacked to avoid multiple conflicting measurement values to correspond to the same cell of the table. Further in this case, when a metric has been added to a column, such as Custom Link Views 328 and within the same table, another metric has been added to a row, such as Reloads 325, and where the intersection occurs at cell 334, the cell is blank to reflect to conflict between the two metrics. Similarly in this example, all table cells at the intersection of a metric value in a row and a metric value in a column are defined to be empty. However, for the remaining cells of the columns in FIG. 3B, there is no conflict between metric values and the table populates each cell according to the analytics data and the assets in the corresponding rows and columns.

Pivoting

In the simplest case, a report may consist of a metric and a dimension item of a dimension. In such a case, pivoting the X- and Y-axis is a trivial matter because each single column from left to right becomes a single row from top to bottom, and similarly, each single row from top to bottom becomes a single column from left to right, with row/column labels and table values being correspondingly transposed. However, when a report includes hierarchically nested row assets or hierarchically stacked column assets, additional considerations come to the fore.

As discussed above in regard to FIGS. 3A-3D, a report may include multiple hierarchically nested rows, or a report may include hierarchically stacked assets corresponding to a single row, or a report may also include assets hierarchically stacked to correspond to a single column or assets hierarchically stacked to correspond to multiple columns.

In one embodiment, pivoting hierarchically nested row assets into correspondingly hierarchically stacked column assets may result in fewer columns than the rows for the hierarchically nested row assets. For example, at each successive hierarchical row level, the assets at a lower nested hierarchy may each correspond to a column, however, the asset at the level above does not need its own column because it may be stacked on top of one of the columns created for the lower hierarchy. Further, this continues to be true at each successive hierarchical level. Generally, in an example pivot operation, the number of resulting columns is the number of rows minus the number of nested levels. For example, consider the hierarchical row structure of elements 318-322 of FIG. 3A. In this example there are four rows, row 318 for Mozilla Firefox 4.0, the top level of this hierarchy (ignoring the Browsers 313 dimension level for simplicity), and rows 320-322 corresponding to segments nested one level beneath the top level. In this example, pivoting rows 318, 320-322 creates three columns (one for each of the segments in the lower hierarchical level), and two stacked levels (one for each level of the hierarchy). Specifically, for each level of the row hierarchy, starting at the top, a title bar corresponding to the current level of the row hierarchy is created that spans each column created for each of the assets in the next level down. In this case, a title bar panel is created for Mozilla Firefox 4.0 that spans three columns, one for each of the three segments in the next level down, segments 320-322.

In other embodiments, instead of condensing a hierarchically nested row level, the row at the top of the hierarchically nested row can be added to its own column prior to the creation of the hierarchically stacked columns described above in the example corresponding to FIG. 3A. This option may be user selectable or configurable, or the user may define default behavior.

In one embodiment, pivoting hierarchically stacked column assets into correspondingly hierarchically nested row assets may result in a greater amount of rows than the initial quantity of columns. Similar to the discussion above regarding the reason why fewer columns may result from pivoting rows, the default presentation of a row hierarchy displays an asset at a level above other assets in its own row, while the row asset with lower level assets applies a filter to each lower level row.

Figure 9:
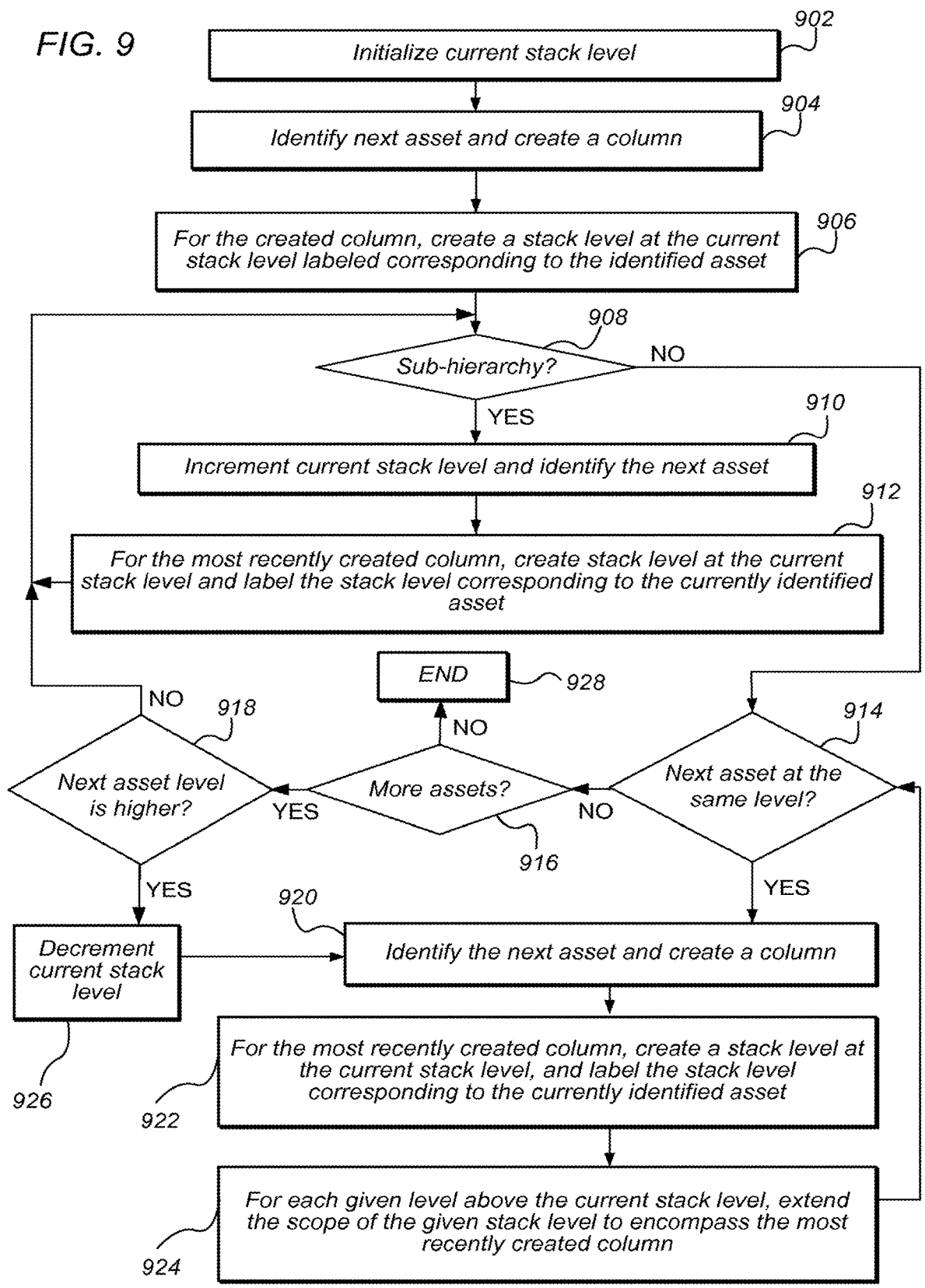
FIG. 9 is a flowchart depicting selected processing stages in pivoting a hierarchically nested set of rows into a hierarchically stacked set of columns.

FIG. 9 depicts an example flowchart illustrating selected stages in pivoting hierarchically nested rows into hierarchically stacked columns. FIG. 11A depicts an example set of rows prior to a pivot and FIG. 11B depicts an example set of columns corresponding to a pivot of the rows in FIG. 11A.

With regard to the hierarchically nested rows of FIG. 11A, in this example, a pivot may begin at stage 902 of FIG. 9, where a variable, current_stack_level, is initialized to level 0. At stage 904 the next asset is identified, asset0 and a column is created, corresponding to column 0 in FIG. 11 B. At stage 906, a stack level is created for the most recently created column, column 0, and the created stack level is stack level 0, and stack level 0 is labeled with asset0.

At stage 908, a determination is made as to whether asset0 includes a nested row, or in other words, whether asset0 includes a sub-hierarchy. In this example, asset1 is nested within asset0, and therefore processing continues to stage 910, where the current_stack_level is incremented to level 1, and the next asset, asset1, is identified. At stage 912, for the most recently created column, column 0, a stack level at the current stack level is created, stack level 1, and labeled asset1, as depicted in FIG. 11B. In this example, processing continues at the determination of whether the current asset, asset1, includes a sub-hierarchy, at stage 908. In this example, asset1 includes sub-hierarchy asset2, therefore processing continues at stage 910, where the current_stack_level is incremented to level 2, and the next asset is identified, asset2. At stage 912, a stack level at level 2 is created, which is beneath stack level 1, and created stack level 2 is labeled with asset2, as depicted in FIG. 11B. At this point in the example, the current_stack_level is 2, and the currently identified asset is asset2.

In this example, another determination is made as to whether asset2 includes a sub-hierarchy, and in this case, it does not, and processing continues at stage 914, where a determination of whether more assets at the current stack level, stack level 2 are present. In this case, the next asset, asset3, is also at stack level 2, and so processing continues to stage 920. At stage 920 the next asset, asset3, is identified, and a column is created adjacent to the previous column, and this created column is column 1 in FIG. 111B. At stage 922, for the most recently created column, column 1, a stack level is created at the current stack level, level 2, and the created stack is labeled with the currently identified asset, asset3. At stage 924, for each given level above the current stack level, levels 0 and 1, the scope of the stack levels is expanded to encompass the most recently created column, column 1, as depicted in FIG. 11B. At this point in the example, the current_stack_level is 2, and the currently identified asset is asset3.

At stage 914, a determination is made as to whether the next asset, asset4, is at the current stack level, and because asset3 and asset4 are not at the same level, processing continues to stage 916. At stage 916, a determination is made as to whether there are more assets, and there are more assets, asset4 and asset5, and therefore processing continues to stage 918. At stage 918, a determination is made as to whether the next asset, asset4, is at a higher level, and since asset4 is at nested level 1, it is at a higher level than the currently identified asset, asset3, and therefore processing continues to stage 926. At stage 926, the current_stack_level is decremented to 1. At stage 920, the next asset is identified, asset4, and a column is created, column 2. At stage 922, for the most recently created column, a stack level is created at the current stack level, level 1, and the stack level is labeled corresponding to the currently identified asset, asset4. At stage 924, for each level above the current stack level, in this case only level 0, the scope of the stack level, or the scope of asset0, is extended to encompass the most recently created column, column 2, as depicted within FIG. 11B. At this point in the example, the current stack level is level 1, and the currently identified asset is asset4.

At stage 914, a determination is made as to whether the next asset is at the same level, and because asset4 and asset5 are not at the same level, processing continues to stage 916. At stage 916, a determination is made as to whether there are more assets, and there are more assets, asset5, and therefore processing continues to stage 918. At stage 918, a determination is made as to whether the next asset, asset5, is at a higher level, and since asset5 is at nested level 0, it is at a higher level than the currently identified asset, asset4, and therefore processing continues to stage 926. At stage 926, the current_stack_level is decremented to 0. At stage 920, the next asset, asset5, is identified and a column, column 3 is created. At stage 922, for the most recently created column, column 3, a stack level at the current stack level, level 0, is created, and the stack level is labeled according to the currently identified asset, asset5. At stage 924, for each given level above the current stack level the scope is extended, however, in this case there are no levels above the current_stack_level of 0, and so processing continues to stage 914. At this point in the example, the current stack level is 0, and the currently identified asset is asset5.

At stage 914, a determination is made as to whether the next asset is at the same level, however, in this case, there is no next asset and so processing continues to stage 916. At stage 916, a determination is made as to whether there are any more assets, and in this case, there are not, and therefore processing continues to stage 928, where the pivot operation ends.

At this point, the hierarchically stacked columns, as depicted in FIG. 11B, have been created to correspond to the hierarchically nested rows in FIG. 11A.

Figure 10:
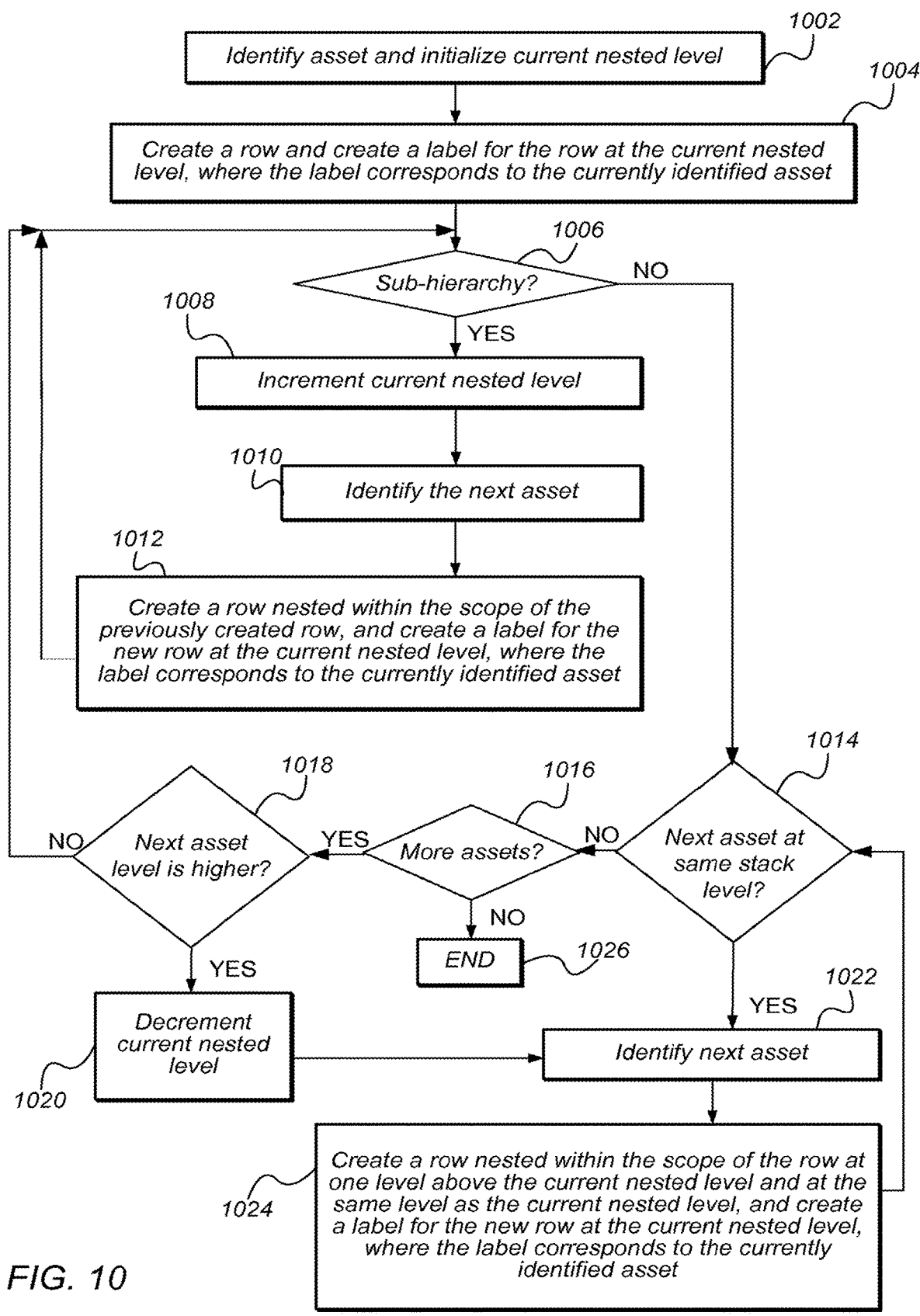
FIG. 10 is a flowchart depicting selected processing stages in pivoting a hierarchically stacked set of columns into a hierarchically nested set of rows.

FIG. 10 depicts an example flowchart illustrating selected stages in pivoting hierarchically stacked columns into hierarchically nested rows. FIG. 11B depicts an example set of columns prior to a pivot and FIG. 11A depicts an example set of rows corresponding to a pivot of the columns in FIG. 11B.

With regard to the hierarchically stacked columns of FIG. 11B, at stage 1002 the next asset, asset0, is identified, and the current_nested_level is initialized to 0. At stage 1004, a row is created, row 0, and a label for the row is created at the current nested level, level 0, where the label corresponds to the currently identified asset, asset0.

At stage 1006, a determination is made as to whether the currently identified asset, asset0, includes a sub-hierarchy, or in other words, whether asset0 has another asset stacked beneath the current asset. In this case, asset1 is stacked beneath asset0, and therefore processing continues to stage 1008, where the current_nested_level is incremented to 1. At stage 1010, the next asset is identified, asset1. At stage 1012, a row is created, row 1, which is nested within the scope of the previously created row, row 0, and further, a label is created for the new row, row 1 at the current_nested_level, level 1, where the label corresponds to the currently identified asset, asset1. At this point, the current_nested_level is 1 and the currently identified asset is asset1.

At stage 1006, a determination is made as to whether the currently identified asset, asset1, includes a sub-hierarchy, and in this case, asset1 is stacked above asset2, and therefore, processing continues to stage 1008. At stage 1008, the current_nested level is incremented to 2. At stage 1010, the next asset, asset2, is identified. At stage 1012, a row is created, row 2, which is nested within the scope of the previously created row, row 1, and further, a label is created for the new row, row 2 at the current_nested_level, level 2, where the label corresponds to the currently identified asset, asset2. At this point, the current_nested_level is 2 and the currently identified asset is asset2.

At stage 1006, a determination is made as to whether the currently identified asset, asset2, includes a sub-hierarchy, and in this case, asset2 is stacked at the same level as asset3, and therefore, processing continues to stage 1014. At stage 1014, a determination is made as to whether more assets exist at the current_stack_level, and in this case, asset3 exists at the same stack level as asset2, and therefore, processing continues to stage 1022. At stage 1022, the next asset is identified, asset3. At stage 1024, a new row is created, row 3, where row 3 is nested within the scope of the row at one level above the current nested level, and since the current_nested_level is 2, row 3 is created within the scope of row 1, or within the scope of asset1, as depicted within FIG. 11A. Further at stage 1024, the new row, row 3 is created at the same level as the current nested level, level 2, which is the level for asset2, and the label for row 3 is placed at the current nested level, level 2, and the label is asset3. At this point in the example, the current_nested_level is 2, and the currently identified asset is asset3.

At stage 1014, a determination is made as to whether the next asset is at the same stack level as asset3, and in this case, the next asset, asset4 is at a higher level, and therefore processing continues to stage 1016. At stage 1016, a determination is made as to whether there are more assets, and since there are more assets, processing continues to stage 1018. At stage 1018, a determination is made as to whether the next asset is at a higher level, and in this case, the next asset is asset4 is at a higher level, and therefore processing continues to stage 1020. At stage 1020, the current_nested_level is decremented to 1. At stage 1022, the next asset is identified, asset4. At stage 1024, a new row is created, row 4, where row 4 is nested within the scope of the row at one level above the current nested level, and since the current_nested_level is 1, row 4 is created within the scope of row 0, or within the scope of asset0, as depicted within FIG. 11A. Further at stage 1024, the new row, row 4 is created at the same level as the current nested level, level 1, which is the level for asset1, and the label for row 4 is placed at the current nested level, level 1, and the label is asset4. At this point in the example, the current_nested_level is 1, and the currently identified asset is asset4.

At stage 1014, a determination is made as to whether the next asset is at the same stack level as asset4, and in this case, the next asset, asset5 is at a higher level, and therefore processing continues to stage 1016. At stage 1016, a determination is made as to whether there are more assets, and since there are more assets, processing continues to stage 1018. At stage 1018, a determination is made as to whether the next asset is at a higher level, and in this case, the next asset is asset5 is at a higher level, and therefore processing continues to stage 1020. At stage 1020, the current_nested_level is decremented to 0. At stage 1022, the next asset is identified, asset5. At stage 1024, a new row is created, row 5, where row 5 is nested within the scope of the row at one level above the current nested level, and since the current_nested_level is 0, row 5 is created at the top level, which is not within the scope of another row or asset, as depicted within FIG. 11A. Further at stage 1024, the new row, row 5 is created at the same level as the current nested level, level 0, which is the level for asset0, and the label for row 5 is placed at the current nested level, level 0, and the label is asset5. At this point in the example, the current_nested_level is 0, and the currently identified asset is asset5.

At stage 1014, a determination is made as to whether the next asset is at the same stack level as asset5, and in this case, there is no next asset, and therefore processing continues to stage 1016. At stage 1016, a determination is made as to whether there are more assets, and since there are no more assets, processing continues to stage 1026, which ends the pivot operation.

At this point, the hierarchically nested rows, as depicted in FIG. 11A, have been created to correspond to the hierarchically stacked columns in FIG. 11B.

Rolling Dates

Figure 4A:
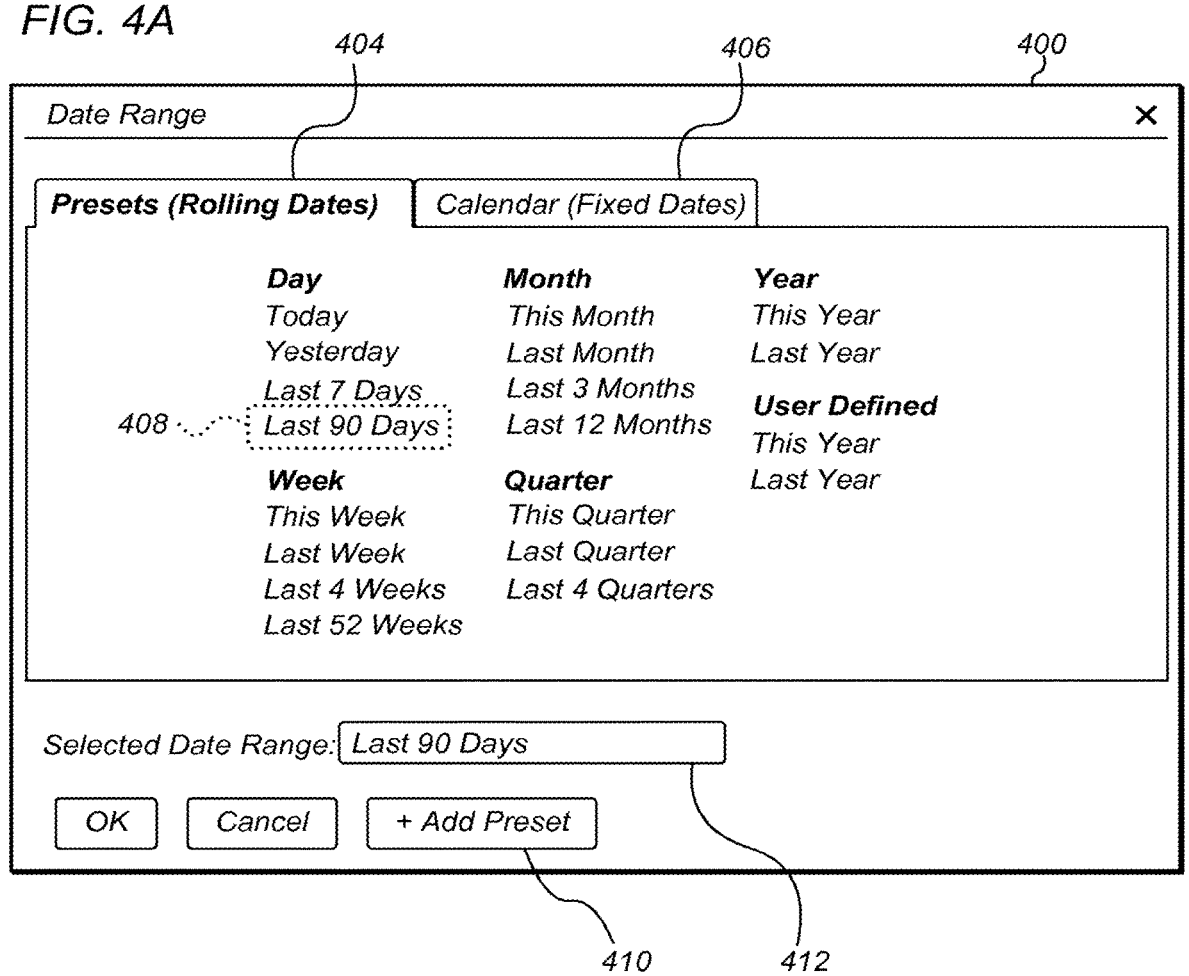
FIGS. 4A and 4B depict illustrations of a user interface for specifying date parameters within a report building tool, according to some embodiments.
Figure 4B:
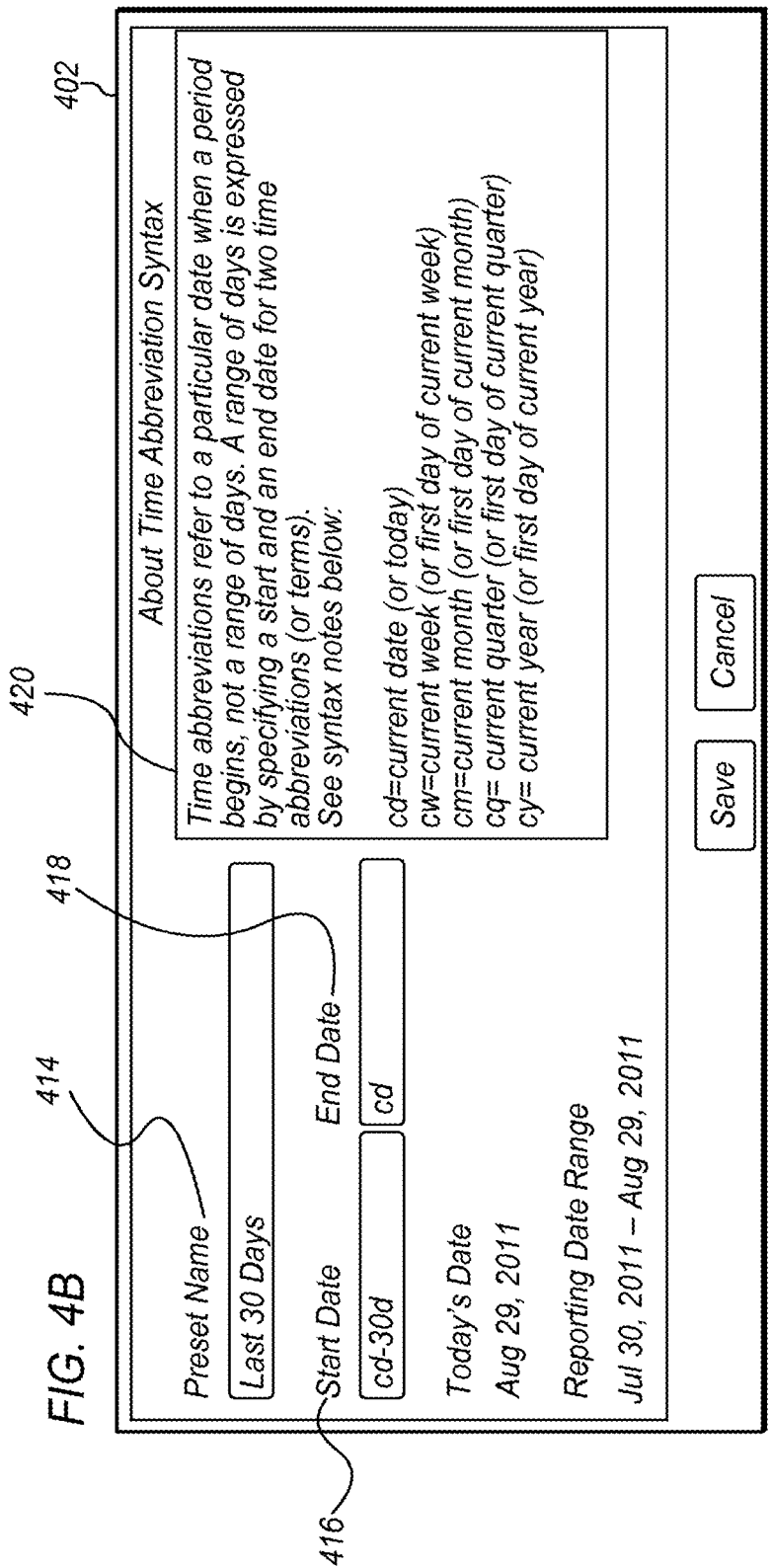

FIGS. 4A and 4B depict elements of user interfaces 400 and 402, according to one embodiment, allowing a user to define date range information for a report. In one embodiment, date range window 400 may be displayed in response to a user selecting date icon 288 in FIG. 2B.

Within date range window 400, a user may select from two tabs, Presets 404 and Calendar 406. The Presets 404 tab displays multiple, system-defined default values from which a user may select one or more rolling date ranges. A rolling date is defined relative to the time at which a report may be generated. For example, in the report generated in FIG. 2B, the date range of the report is the last 90 days. In this way, given a rolling date of the last 90 days, on whatever day a user generates the report, the relevant In this example, a user has selected a rolling date of the previous 90 days, as indicated within the Selected Date Range 412 interface element. In this example, in response to a user selection within a selection area of one of the displayed rolling date ranges, a user may specify a corresponding rolling date range. Selection area 408, corresponding to a rolling date of the previous 90 days, is one example selection area.

In some cases, a user may select on the Calendar 406 tab to be presented with a graphical illustration of a calendar from which a user may click and drag or simply click to define a specific date range for a report.

Add Preset 410 icon allows a user to further specify rolling date ranges. In this example, in response to a user selection of the Add Preset 410 icon, user interface window 402 is displayed. User interface window 402 in FIG. 4B allows a user to define preset names that may be added to the Presets 404 tab of the date range window 400. For example, Preset Name 414 has been specified to be "Last 30 Days", and when a user chooses to save this definition, it may be added to the options displayed within the Presets 404 tab in date range window 400. The preset name of "Last 30 Days" is arbitrary and may be any user-specified text.

In defining a new preset rolling date, a user may specify the beginning and end date ranges. In this example, a user has defined the preset name of "Last 30 Days" to have a start date of the current date minus 30 days and an end date of the current date. In creating this rolling date definition, a user may choose from the list of abbreviations within panel 420. Other available abbreviations are "cd" for current date, "cw" for current week, "cm" for current month, "cq" for current quarter, "cy" for current year, among possible user-defined abbreviations.

In other embodiments, not displayed, a user may define a rolling date with even greater specificity. For example, a user may define a rolling date of "Last 10 Weekends", or "Last Summer", or "Months That Rhyme With Fray." Further, in defining a weekend, a user may specify Friday, Saturday, and Sunday, or simply Friday and Saturday. In other words, the report building tool does not impose restrictions in how a user may define a given rolling date.

Client/Server Architecture

FIG. 5 depicts an illustration, according to one embodiment, of a computing environment in which analytics data may be collected. However, the type of data is not relevant to the above-described operation and functionality of the report building tool. In other words, any set of data may serve as the basis from which reports may be generated. In some cases, baseball statistics, financial transactions, stock data, or any other set of data which a user may desire to analyze through the application of heterogeneous combinations of dimensions, segments, and metrics in dynamically generating a report.

In the case of manipulating analytics data, a user of the report building tool may have access to the remotely or locally stored analytics data for a given content site. For example, the user may, using the report building tool, log in to an analytics server corresponding to the content site. In some cases, functionality for accessing the analytics server may be built in to the report building tool. In other cases, a plugin may provide the report building tool with the ability to log in to an analytics server and may handle communications with the analytics server. In other embodiments, the analytics information may be stored locally, and the report building tool may access the analytics information locally. Other methods for accessing the analytics information are possible, and so long as analytics data can be accessed, the disclosed embodiments may operate successfully. In other embodiments, a stand-alone application may be developed to provide for the functionality described within the various disclosed embodiments.

Collection of analytics data may be performed in a variety of ways, and the disclosed embodiments of a report building tool do not depend on any particular method for the collection of analytics data. In some cases, log files may be created on a content provider server to record every transaction made between a device consuming content and the server providing the content, such as between User 508 and Content Provider Server 504 in FIG. 5, or between User 510 and Content Provider Server 504. The log files created may be periodically or aperiodically transmitted to an analytics server, such as Analytics Server 506 in FIG. 10.

Another approach that may be used is page tagging or web bugs, where the request for a content page may result in a content page that, upon being displayed by a user's internet-enabled application, may initiate tracking of the user's navigation habits and provide the tracking information to an analytics server. In some cases, an image request indicated within a requested page serves as the catalyst for the execution of a script used to collect the analytics data. The analytics data is reported along with the image request made to the analytics server. The actual requested image may be invisible to the user, such as a transparent 1×1 pixel, displayed within the content page. Some types of analytics data collected may be hits, or a request for a file from a web server, page views, visits, sessions, unique visits, unique visitors, repeat visitors, new visitors, impressions (of advertisements or other content), singletons (visits where only a single page is viewed), bounce rate (percentage of singleton visits), exit percentage, visibility time, session duration, page view duration, engagement time (amount of time a visitor is on a page), page views per session, click paths, clicks, browser type, display size, display resolution, among other metrics.

Cloud Computing Environment

Figure 6:
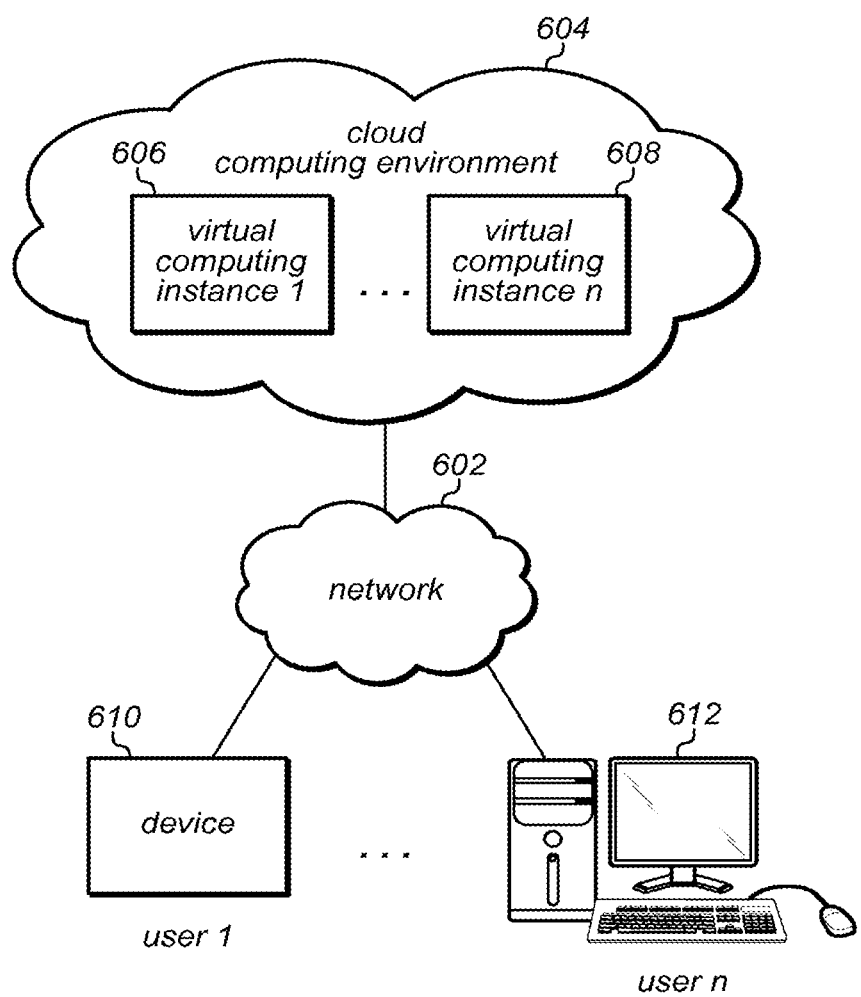
FIG. 6 depicts an illustration of a cloud computing environment in which the report building tool may be implemented, according to some embodiments.

FIG. 6 depicts one possible computing environment that includes a device 610 accessing a cloud computing environment 604 over network 602. In this example, an installed application on a device may be used to access any of the above-discussed embodiments of a report building tool executing within one of the virtual computing instances 606 through 608. Further, in some embodiments, different combinations of the above-discussed computational elements of a report building tool may be implemented locally on device 610 and remotely within one of the virtual computing instances 606 through 608.

In other embodiments, the report building tool may be implemented on a computer 612 accessing cloud computing environment 604 over network 602. In this example, a user may log in to cloud computing environment 604 to access a virtual computing instance within which an embodiment of the report building tool is executing or may be executed. Further, in some embodiments, different combinations of the above-discussed computational elements of a report building tool may be implemented locally on computer 612 and remotely within one of the virtual computing instances 606 through 608.

Example Computer System

Figure 8:
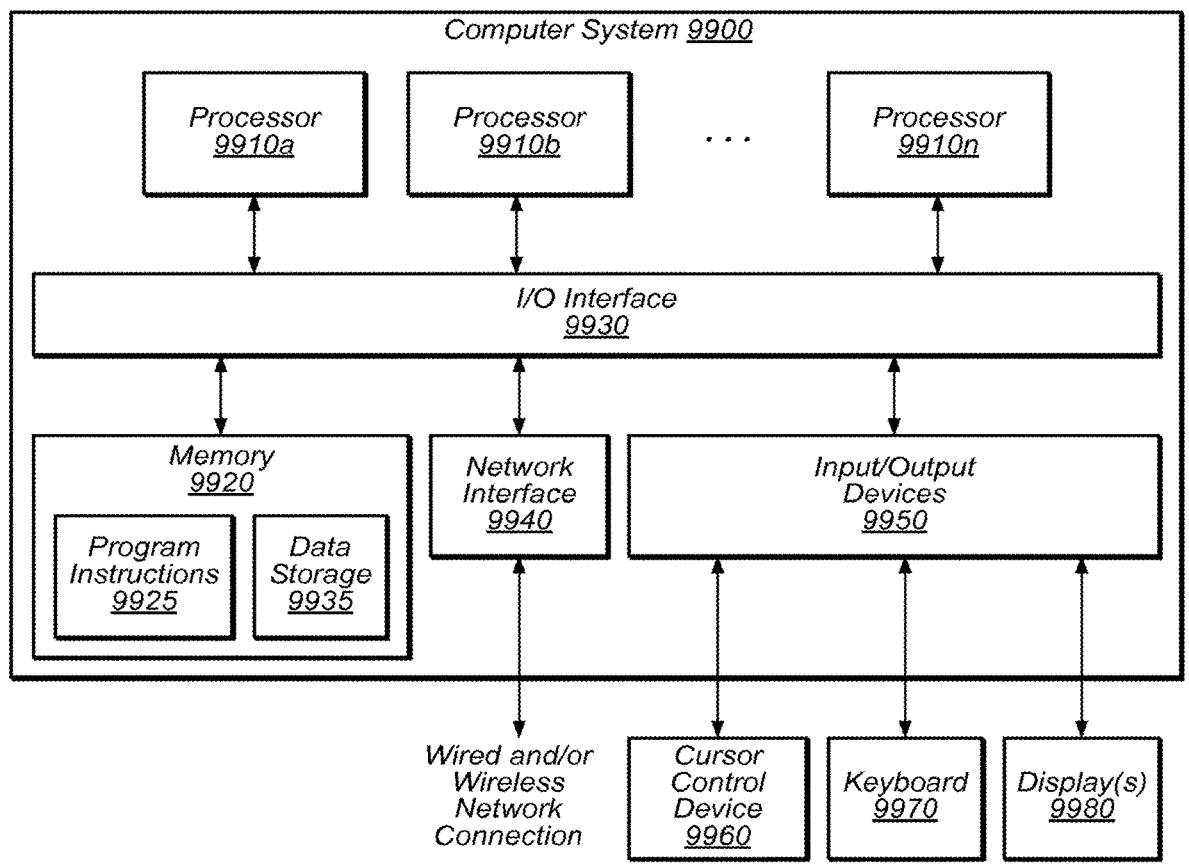
FIG. 8 depicts elements of an example computer system capable of implementing a report building tool.

FIG. 8 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9910a-9910n coupled to system memory 9920 via input/output (I/O) interface 9930. The computer system further includes network interface 9940 coupled to I/O interface 9930, and one or more input/output devices 9950, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method comprising:
providing, by a computing device, a user interface to specify a report across dimensions of web site analytics data, wherein:
the report comprises rows and columns defined according to a hierarchy that comprises (i) measurable metrics of the web site analytics data and (ii) segments for filtering the measurable metrics,
the user interface comprises user interface (UI) elements configured to receive input specifying the dimensions, the measurable metrics, and the segments, and
the user interface presents the report and the dimensions, measurable metrics, and segments within the report;
receiving a change in a location of a segment in the hierarchy based on an application of a user interface (UI) operation to the segment within the user interface;
updating, by the computing device, the hierarchy based on the change; and
generating, by the computing device, the report based on the updated hierarchy, the rows and columns of the report having values defined based on a unique path that defines a value for a column or a row of the report based on the change.

2. The computer-implemented method of claim 1, wherein the UI operation comprises a drag and drop of the segment within the user interface.

3. The computer-implemented method of claim 1, wherein the UI operation comprises a pivot of the segment within the user interface.

4. The computer-implemented method of claim 1, wherein the measurable metrics comprise measurable attributes of visitor interaction with content of a web site, and wherein the segments identify web site visitors having at least one measurable attribute in common.

5. The computer-implemented method of claim 1, further comprising:
prior to generating the report, determining whether a locally stored portion of the web site analytics data from a server is sufficient to generate the report according to the hierarchy;
wherein generating the report is based on the locally stored portion of the web site analytics data in response to a determination that the locally stored portion of the web site analytics data from the server is sufficient to generate the report; and wherein in response to a determination that the locally stored portion of the web site analytics data from the server is not sufficient to generate the report, retrieving additional web site analytics data.

6. The computer-implemented method of claim 1, wherein a row or column in the report is filtered according to an intersection of at least two of the segments.

7. The computer-implemented method of claim 1, wherein the hierarchy further comprises the dimensions, where a unique path through the hierarchy and comprising a dimension, a measurable metric, and a segment defines a value for a cell of the report.

8. The computer-implemented method of claim 7, further comprising receiving, via the user interface, input changing an order of at least one of a dimension or a measurable metric in the hierarchy to modify a definition of at least one row or column in the report, wherein a value displayed in the cell of the report is based on the order.

9. The computer-implemented method of claim 1, wherein the report is generated from an existing report in response to receiving input via a UI element of the user interface corresponding to a pivot operation, wherein each row of the report is based on a corresponding column of the existing report, wherein each column of the report is based on a corresponding row of the existing report, and wherein the hierarchy describes both the report and the existing report.

10. The computer-implemented method of claim 1, further comprising:
    receiving, via the UI elements, a placement of a segment in the report, wherein the placement corresponds to a hierarchical level of the hierarchy; and
    receiving, via the UI elements, a selection of a dimension, wherein upon receiving the placement of the segment and the selection of the dimension, the report is generated in response to receiving input to a UI element requesting the report.

11. The computer-implemented method of claim 1, further comprising:
    displaying, within a display area of the user interface, the segments, and wherein the UI operation comprises a drag and drop input that is received via the user interface and that corresponds to a drag of a single segment of the segments from the display area onto a row or column of an existing report, and wherein the report is generated in response to receiving the drag and drop input.

12. A system, comprising:
    a processor; and
    a memory storing program instructions that, when executed by the processor, cause the system to:
        provide a user interface to specify a report across dimensions of web site analytics data, wherein:
            the report comprises rows and columns defined according to a hierarchy that comprises (i) measurable metrics of the web site analytics and (ii) segments for filtering the measurable metrics,
            the user interface comprises user interface (UI) elements configured to receive input for specifying the dimensions, the measurable metrics, and the segments, and
            the user interface presents the report and the dimensions, measurable metrics, and segments within the report;
        receive a change in a location of a segment in the hierarchy based on an application of a user interface (UI) operation to the segment within the user interface;
        update the hierarchy based on the change; and
        generate the report based on the updated hierarchy, the rows and columns of the report having values defined based on a unique path through the updated hierarchy, wherein the unique path defines a value for a column or a row of the report based on the change.

13. The system of claim 12, wherein the UI operation comprises at least one of: a drag and drop of the segment within the user interface, or a pivot of the segment within the user interface.

14. The system of claim 12, wherein the measurable metrics comprise measurable attributes of visitor interaction with content of a web site, and wherein the segments identify web site visitors having at least one measurable attribute in common.

15. The system of claim 12, wherein the instructions further cause the system to receive, via the user interface, input specifying a plurality of segments, wherein a row or column in the report is filtered according to an intersection of the plurality of segments.

16. The system of claim 12, wherein the instructions further cause the system to receive, via the user interface, input changing an order of a measurable metric in the hierarchy to modify a definition of a row in the report, wherein a value displayed in a cell belonging to the row is based on the order.

17. A non-transitory computer-readable storage medium storing program instructions that, when executed by a computing device, cause the computing device to perform operations comprising:
    providing a user interface to specify a report across dimensions of web site analytics data, wherein:
        the report comprises rows and columns defined according to a hierarchy that comprises (i) measurable metrics of the web site analytics data and (ii) segments for filtering the measurable metrics,
        the user interface comprises user interface (UI) elements configured to receive input specifying the dimensions, the measurable metrics, and the segments, and
        the user interface presents the report and the dimensions, measurable metrics, and segments within the report;
    receiving a change in a location of a segment in the hierarchy based on an application of a user interface (UI) operation to the segment within the user interface;
    updating the hierarchy based on the change; and
    generating the report based on the updated hierarchy, the rows and columns of the report having values defined based on unique path through the updated hierarchy, wherein the unique path defines a value for a column or a row of the report based on the change.

18. The non-transitory computer-readable storage medium of claim 17:
    wherein the UI operation comprises a pivot of the segment to an existing report within the user interface;
    wherein the report is generated from the existing report in response to receiving input at the user interface corresponding to the pivot operation;
    wherein each row of the report is based on a corresponding column of the existing report;

wherein each column of the report is based on a corresponding row of the existing report; and wherein the hierarchy describes both the report and the existing report.

19. The non-transitory computer-readable storage medium of claim 17, wherein the UI operation comprises a drag and drop operation of the segment to an existing report within the user interface, and wherein the report is generated from the existing report in response to receiving input at the user interface corresponding to the drag and drop operation.

20. The non-transitory computer-readable storage medium of claim 17, wherein the hierarchy further comprises the dimensions, wherein the operations further comprise receiving, via the user interface, input changing an order of a dimension in the hierarchy to modify a definition of a row in the report, wherein a value displayed in a cell belonging to the row is based on the order.

* * * * *